United States Patent
Hashimoto

(10) Patent No.: US 7,282,091 B2
(45) Date of Patent: Oct. 16, 2007

(54) CELLULOSE ACYLATE-BASED DOPE, CELLULOSE ACYLATE FILM, AND METHOD OF PRODUCING A CELLULOSE ACYLATE FILM

(75) Inventor: Kiyokazu Hashimoto, Minami-ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 344 days.

(21) Appl. No.: 10/858,288

(22) Filed: Jun. 2, 2004

(65) Prior Publication Data
US 2004/0247918 A1    Dec. 9, 2004

(30) Foreign Application Priority Data

Jun. 4, 2003  (JP) .............................. 2003-159273
Jun. 4, 2003  (JP) .............................. 2003-159982
Nov. 4, 2003  (JP) .............................. 2003-374856

(51) Int. Cl.
*C08L 1/08*    (2006.01)

(52) U.S. Cl. ............................ 106/163.01; 106/170.27; 106/170.47; 106/170.5; 106/203.1; 106/203.3

(58) Field of Classification Search ............ 106/163.01, 106/170.27, 170.47, 170.5, 203.1, 203.3
See application file for complete search history.

(56) References Cited

FOREIGN PATENT DOCUMENTS

| JP | 2002-160242 A | 6/2002 |
|----|---------------|--------|
| JP | 2002-192541 A | 7/2002 |
| JP | 2003-55476 A  | 2/2003 |

*Primary Examiner*—David M. Brunsman
(74) *Attorney, Agent, or Firm*—Buchanan Ingersoll & Rooney PC

(57) ABSTRACT

A cellulose acylate-based dope, which has an exothermic peak giving a calorific value of 1 to 10 J/g (inclusive), between 0 and 40° C.; wherein collected wastes of cellulose acylate which are obtained by collecting and crushing a cellulose acylate film edge trimmed when raw material of the film is cast, are used in an amount of 5 to 60% by weight of the whole of the cellulose acylate or; wherein the dope comprises a solvent, wherein a recovery solvent is used in an amount of 20 to 100% of the entire solvent and; a cellulose acylate film produced by using the same.

33 Claims, No Drawings

CELLULOSE ACYLATE-BASED DOPE, CELLULOSE ACYLATE FILM, AND METHOD OF PRODUCING A CELLULOSE ACYLATE FILM

FIELD OF THE INVENTION

The present invention relates to a cellulose acylate film which is useful for a liquid crystal image display device, a silver halide photographic photosensitive material, or the like; a cellulose acylate-based dope suitable for forming a cellulose acylate film; and a process for producing the film.

BACKGROUND OF THE INVENTION

Hitherto, a chlorine-containing hydrocarbon, such as dichloromethane, has been used as an organic solvent of a cellulose acylate solution used when forming a cellulose acylate film used in a silver halide photographic photosensitive material or a liquid crystal image display device. Dichloromethane (boiling point, about 40° C.) has been conventionally used as a good solvent for cellulose acylate. Dichloromethane is a preferable solvent due to its advantage of easy drying in film-forming and drying steps in the process for producing an article as described above, because it has a low boiling point. In recent years, as to chlorine-containing organic solvents having a low boiling point, leakage thereof has been remarkably reduced in the step of handling the solvents, even in airtight facilities, from the viewpoint of protecting the environment. For example, an exhaustive closed system to prevent leakage from the system has been developed. Even if the organic solvent is leaked, the following method is adopted to prevent the hydrocarbon from being discharged outdoors: installing a gas-absorbing tower to absorb the organic solvent, and treating the solvent before discharge. This method also has been improved. Furthermore, before discharge, the chlorine-containing organic solvent is decomposed by burning based on thermal power, or by action of electron beams. In this way, the organic solvent has hardly been discharged outdoors. However, it is necessary to conduct further research to attain complete prevention of discharge.

Attempts have been made to find solvents for cellulose acylate that are different from dichloromethane, which has been favorably used as a chlorine-containing organic solvent. Examples of known organic solvents in which cellulose acylate, in particular cellulose triester, can be dissolved include acetone (boiling point, 56° C.), methyl acetate (boiling point, 56° C.), tetrahydrofuran (boiling point, 65° C.), 1,3-dioxolane (boiling point, 75° C.), and 1,4-dioxane (boiling point, 101° C.). Of these examples, methyl acetate is excellent in solubility and film-forming property.

Generally, a film is produced by a method in which a dope (a concentrated polymer solution) using the aforementioned organic solvents is cast on a band and peeled from the band, followed by drying with conveying. Methods for producing a film from a dope prepared with methyl acetate are described in JP-A-2002-192541, JP-A-2002-160242, and JP-A-2003-55476. These methods are primarily directed at improving the solubility of a polymer, which results in improvements in each of long-term continuous productivity of the film, storage stability of the dope, and ease of peeling from the band.

However, in each of these methods, optical unevenness (i.e., unevenness of retardation (Rth) in the thick direction; the term "retardation in the thick direction" means the value of the difference in an average refractive indices in the casting direction (MD) and the width direction (TD) and the refractive index in thick direction (TH); multiplied by the thickness of the film) is large. Further, uneven thermal expansion are apt to arise.

In addition, in each of these methods, a formed film of the dope is low in elastic modulus at the time of peeling, and stretch is easily caused by tension during conveyance of the formed film after peeling. From these defects, optical unevenness (i.e., unevenness of retardation (Re) in the face; the term "retardation in the face" means the value of the difference in refractive indices of the film between the casting direction (MD) and the width direction (TD), multiplied by the thickness of the film) and uneven thermal shrinkage are apt to arise.

The production of cellulose acylate films by a cast method is classified into a method called "drum casting" which comprises steps of casting the prepared cellulose acylate solution onto a chilled drum, cooling it to a temperature ranging from 15° C. to −100° C., for gelling, and then peeling the gelled cellulose acylate, followed by drying the peeled film; and a method called "band casting" which comprises steps of casting the prepared cellulose acylate solution onto a band heated at a temperature ranging from 15° C. to 50° C., for drying, and then peeling the dried film. However, the aforementioned problems have been remarkable in drum casting.

When Rth unevenness is large, in case that a cellulose acylate film is used for a large-size liquid crystal display plate, irregularity (unevenness) of display resulting from the uneven Rth is easy to occur. In particular, when the large-size liquid crystal display plate is seen from the oblique direction thereof, this problem is remarkable. In addition, if the uneven thermal expansion is severe, uneven stress to the expansion occurs on account that the heat expansion owing to thermal generated from light sources is locally different, which easily leads to occurrence of optical unevenness owing to photo-elasticity. Therefore, improvement on these defects has been desired.

When a cellulose acylate film is used for a large-size liquid crystal display plate, irregularity (unevenness) of display resulting from uneven Re easily occurs. In addition, if uneven thermal shrinkage is severe, uneven stress to the shrinkage occurs, because the thermal shrinkage owing to heat generated from light sources is locally different, which easily leads to occurrence of optical unevenness owing to photoelasticity.

Further, when a cellulose acylate film is used for a silver halide photosensitive material, such uneven thermal expansion or uneven thermal shrinkage easily causes image distortion during long-term preservation. In other words, a major cause for these problems is a shortage of strength when a dope is cast. Therefore, improvement on these defects has been desired.

SUMMARY OF THE INVENTION

The present invention resides in a cellulose acylate-based dope, which has an exothermic peak giving a calorific value of 1 to 10 J/g (inclusive), between 0 and 40° C.

Further, the present invention resides in a process for producing a cellulose acylate based dope, comprising the steps of:

(1) adding collected wastes of cellulose acylate, which are obtained by collecting and crushing a cellulose acylate film edge trimmed when raw material of the film is cast, again when the dope is produced, and (2) cooling the cellulose acylate, and heating the cellulose acylate stepwise, to dissolve the cellulose acylate.

Further, the present invention resides in a cellulose acylate-series dope having a diffraction peak (A) whose full width at half maximum is from 0.1 degrees to 2 degrees in the range from 2θ=20 degrees to 2θ=25 degrees, when measured according to X-ray diffraction while cooling at −50° C.

Further, the present invention resides in a process for producing a cellulose acylate-based dope, comprising the steps of:
(1) using a recovery solvent;
(2) swelling a cellulose acylate before dissolution; and
(3) multistage-cooling the cellulose acylate during cooling/heat-up dissolution.

Other and further features and advantages of the invention will appear more fully from the following description.

DETAILED DESCRIPTION OF THE INVENTION

According to the present invention, there are provided the following means:

(1) A cellulose acylate-based dope, which has an exothermic peak giving a calorific value of 1 to 10 J/g (inclusive), between 0 and 40° C.

(2) The cellulose acylate-based dope according to the above item (1), wherein the absorbance (A40) of the dope to a wavelength of 550 nm at 40° C. is 0.02 to 3 (inclusive) higher than the minimum absorbance (Am) thereof to a wavelength of 550 nm at temperatures ranging from 0 to −40° C.

(3) The cellulose acylate-based dope according to the above item (1), wherein the infrared spectrum intensity ratio of the dope before the addition of boric acid (A1=a value obtained by dividing the absorbance of the dope to a wave number of 3552 $cm^{-1}$ by the absorbance thereof to a wave number of 3475 $cm^{-1}$, or A2=a value obtained by dividing the absorbance of the dope to a wave number of 3629 $cm^{-1}$ by the absorbance thereof to a wave number of 3475 $cm^{-1}$), and the infrared spectrum intensity ratio when 1.5%, by mass, of boric acid is added to the dope (B1=a value obtained by dividing the absorbance of the dope to a wave number of 3552 $cm^{-1}$ by the absorbance thereof to a wave number of 3475 $cm^{-1}$, or B2=a value obtained by dividing the absorbance of the dope to a wave number of 3629 $cm^{-1}$ by the absorbance thereof to a wave number of 3475 $cm^{-1}$), satisfy the following expressions (A) and (B):

$$3.0 \geq B1/A1 \geq 1.2 \quad \text{Expression (A)}$$

$$3.0 \geq B2/A2 \geq 1.2 \quad \text{Expression (B)}$$

(4) The cellulose acylate-based dope according to any one of the above items (1) to (3), wherein the cellulose acylate is made of one, or a mixture of two or more, selected from cellulose acylates wherein the substitution degree of cellulose to a hydroxy group satisfies all of the following expressions (i) to (iii):

$$2.6 \leq SA+SB \leq 3.0 \quad \text{(i)}$$

$$2.0 \leq SA \leq 3.0 \quad \text{(ii)}$$

$$0 \leq SB \leq 0.8 \quad \text{(iii)}$$

wherein, SA and SB represent degrees of substitution of acyl groups for hydroxyl groups of cellulose, and more specifically SA is the degree of acetyl substitution and SB is the degree of acyl substitution having 3 to 22 carbon atoms.

(5) The cellulose acylate-based dope according to the above item (4), wherein at least one chlorine-free organic solvent is used, which is selected from ethers having 3 to 12 carbon atoms, ketones having 3 to 12 carbon atoms, and esters having 3 to 12 carbon atoms.

(6) A process for producing a cellulose acylate-based dope, comprising the steps of:
(i) adding collected wastes of cellulose acylate, which are obtained by collecting and crushing a cellulose acylate film edge trimmed when raw material of the film is cast, again when the dope is produced, and
(ii) cooling the cellulose acylate, and heating the cellulose acylate stepwise to dissolve the cellulose acylate.

(7) A cellulose acylate film, produced by use of the cellulose acylate-based dope according to any one of the above items (1) to (5).

(8) The cellulose acylate film according to the above item (7), which is for a polarizing plate, for an optically compensating film, or for a low reflecting film.

(9) The cellulose acylate film according to the above item (7), which is for a liquid crystal display element.

(10) A polarizing plate, wherein at least one layer made of the cellulose acylate film according to the above item (7) is laminated, as a light-polarizing layer.

(11) The polarizing plate according to the above item (10), wherein the light-polarizing layer is drawn by use of a tenter in the state that the absorption axis of the layer is inclined at an angle of 45 to 90 degrees to the carrying direction of the layer.

(12) An optically compensating film for a liquid crystal display plate, wherein the cellulose acylate film according to the above item (7) is used as a substrate.

(13) An antireflection film, wherein the cellulose acylate film according to the above item (7) is used as a substrate.

(14) A silver halide photographic photosensitive film, wherein the cellulose acylate film according to the above item (7) is used as a substrate.

(Hereinafter, a first embodiment of the present invention means to include the cellulose acylate-based dopes described in the items (1) to (5) above, the producing process described in the item (6) above, the cellulose acylate films described in the items (7) to (9) above, the polarizing plates described in the items (10) to (11) above, the optically compensating film described in the item (12) above, the antireflection film described in the item (13) above, and the silver halide photographic photosensitive film described in the item (14) above.)

(15) A cellulose acylate-based dope having a diffraction peak (A) whose half width is from 0.1 degrees to 2 degrees in the range from 2θ=20 degrees to 2θ=25 degrees, when measured according to X-ray diffraction while cooling at −50° C.

(16) The cellulose acylate-based dope according to the above item (15), wherein the relative intensity of the diffraction peak (A) is in the range from 0.05 to 2.

(17) The cellulose acylate-based dope according to the above item (15) or (16), further having a diffraction peak (B) whose full width at half maximum is from 3 degrees to 20 degrees in the range from 2θ=15 degrees to 2θ=28 degrees.

(18) The cellulose acylate-based dope according to any one of the above items (15) to (17), wherein the ratio of the diffraction peak (A) to the diffraction peak (B) is from 0.05 to 1 in terms of peak intensity.

(19) The cellulose acylate-based dope according to the above item (15), wherein an absorbance of 550 nm at −50° C. (A−50) is higher, by a range from 0.01 to 3, than a minimum absorbance of 550 nm in the range from 0° C. to −40° C. (Am).

(20) The cellulose acylate-based dope according to the above item (15), wherein a property that a temperature at which tanδ (a value of G" (Viscous Modulus) divided by G' (Elastic Modulus)) of not more than 1 is obtained, when measured in a closed system, is in the range from −80° C. to 15° C.

(21) The cellulose acylate-based dope according to the above item (20), wherein G' at the temperature giving tanδ of 1, when measured in a closed system, is in the range from 400 Pa to 4,000 Pa.

(22) The cellulose acylate-based dope according to the above item (15), wherein two or more peaks exist in a distribution curve of diffusion constant at −50° C., in which the difference in the natural logarithm of the diffusion constant between the highest peak and the second highest peak of these peaks is in the range from 0.5 to 8 in terms of absolute value (ΔlogD).

(23) The cellulose acylate-based dope according to the above item (15), wherein the cellulose acylate-series dope is prepared with a cellulose acylate having a property that, in terms of the ratio in height of a peak in the neighborhood of 1056 cm$^{-1}$, to a peak in the neighborhood of 1753 cm$^{-1}$, measured according to infrared spectrophotometry (IR), a value of the ratio measured at −50° C. (I(−50)) is larger, by a range from 0.1 to 1.5, than a value of the ratio measured at 25° C. (I(25)).

(24) The cellulose acylate-based dope according to any one of the items (15) to (23), wherein the cellulose acylate is made of one, or a mixture of two or more, selected from cellulose acylates wherein the substitution degree of cellulose to a hydroxy group satisfies all of the following expressions (I) to (III):

$2.6 \leq SA+SB \leq 3.0$     (I)

$2.0 \leq SA \leq 3.0$     (II)

$0 \leq SB \leq 0.8$     (III)

wherein, SA and SB represent degrees of substitution of acyl groups for hydroxyl groups of cellulose, and more specifically SA is the degree of acetyl substitution and SB is the degree of acyl substitution having 3 to 22 carbon atoms.

(25) The cellulose acylate-series dope according to any one of the above items (15) to (24), wherein the sum total (S6) of a degree of substitution of SA and SB in the 6-position of said cellulose acylate satisfies formula (IV) described below:

$0.8 \leq S6 \leq 1$     (IV)

(26) The cellulose acylate-based dope according to the above item (24) or (25), wherein at least one chlorine-free organic solvent is used, which is selected from ethers having 3 to 12 carbon atoms, ketones having 3 to 12 carbon atoms, and esters having 3 to 12 carbon atoms.

(27) A process for producing a cellulose acylate-based dope, comprising the steps of:

(i) using a recovery solvent;

(ii) swelling a cellulose acylate before dissolution; and (iii) multistage-cooling the cellulose acylate during cooling/heat-up dissolution.

(28) A cellulose acylate film, produced by use of the cellulose acylate-based dope according to any one of the above items (15) to (26).

(29) The cellulose acylate-series dope described in the above item (19) or (20), wherein the increasing ratio (ΔG') of G' at a temperature of from 10° C. to −35° C. measured in a closed system is in the range from 5 Pa/° C. to 300 Pa/° C.

(30) The cellulose acylate film according to the above item (28), which is for a polarizing plate, for an optically compensating film, or for a low reflecting film.

(31) The cellulose acylate film according to the above item (28), which is for a liquid crystal display element.

(32) A polarizing plate, wherein at least one layer made of the cellulose acylate film according to the above item (28) is laminated, as a light-polarizing layer.

(33) The polarizing plate according to the above item (32), wherein the light-polarizing layer is drawn by use of a tenter in the state that the absorption axis of the layer is inclined at an angle of 45 to 90 degrees to the carrying direction of the layer.

(34) An optically compensating film for a liquid crystal display plate, wherein the cellulose acylate film according to the above item (28) is used as a substrate.

(35) An antireflection film, wherein the cellulose acylate film according to the above item (28) is used as a substrate.

(36) A silver halide photographic photosensitive film, wherein the cellulose acylate film according to the above item (28) is used as a substrate.

(Hereinafter, a second embodiment of the present invention means to include the cellulose acylate-based dopes described in the items (15) to (26), and (29) above, the producing process described in the item (27) above, the cellulose acylate films described in the items (28), (30) and (31) above, the polarizing plates described in the items (32) to (33) above, the optically compensating film described in the item (34) above, the antireflection film described in the item (35) above, and the silver halide photographic photosensitive film described in the item (36) above.)

Herein, the present invention means to include all of the above first and second embodiments, unless otherwise specified.

According to the first embodiment of the present invention, in a band flow casting manner of casting a dope onto a band at ambient temperature, and then stripping off the dope while drying the dope, the strength of the dope on the band is made high, thereby solving the above-mentioned problems. That is, the cast dope undergoes volume shrinkage as the dope is dried on the band. However, the dope does not shrink easily in its in-plane direction, because of frictional force between the band and the dope. Thus, shrinkage of the dope advances selectively only in its thickness direction. As a result, molecules in the dope are easily oriented in the thickness direction, such that the Rth of the dope is liable to rise. When the Rth becomes large in this way, variation in the Rth is liable to become large.

When the strength of the dope is low, the dope is easily drawn by tensile stress when the dope is striped. Orientation in the in-plane direction of the dope advances accordingly. As a result, the Rth is easily exhibited. When the dope strength is low at this time, stress unevenness is easily generated when the dope is drawn. Thus, unevenness of the Rth is easily made larger.

As to film in which Rth unevenness is generated and uneven orientation of the molecules is generated in the in-plane direction, the distribution of the thermal expansion coefficient thereof is also liable to become large. The thermal expansion coefficient of molecules is liable to be larger as the thermal motion of the molecules is less restricted. Therefore, if an area where the in-plane direction orientation advances locally is present as described above, an area where the thermal expansion coefficient is locally small is generated. Thus, thermal expansion unevenness is easily generated.

In the first embodiment of the present invention, therefore, it is the chief aim that, in the range of ambient temperatures, which is a temperature band for casting a dope in the band manner, the strength of the dope is improved; that is, the viscosity or the elasticity of the dope is made high. As a result of eager research for the aim, the following has been found out for the first embodiment of the present invention: To improve the strength of a dope, it is important to strengthen the hydrogen bonds between cellulose acylate molecules. That is, cellulose acylate is synthesized by acylating three hydroxyl groups in each unit of a cellulose molecule, but all of the hydroxyl groups in the cellulose molecule cannot be acylated. Thus, unreacted hydroxyl groups remain. By forming hydrogen bonds between the remaining hydroxyl groups of the cellulose acylate molecules, a network is formed in the dope made of the molecules, and the strength of the dope can be improved.

It has been found out for the first embodiment of the present invention that when the dope is scanned in the range of from 40 to 0° C. with a differential scanning calorimeter (DSC), an exothermic peak, on which the number of such hydrogen bonds is reflected, is exhibited in the step of the cooling. The calorific value in this case is preferably from 1 to 10 J/g (inclusive), more preferably from 2 to 9 J/g (inclusive), and even more preferably from 3 to 8 J/g (inclusive). In this way, calories are generated in either of the step of cooling the dope and the step of heating the dope.

Such hydrogen bonds can be made more intense by causing phase separation. In other words, phase separation is followed by the appearance of concentration fluctuation in the dope (i.e. the appearance of high-concentration areas and low-concentration areas, in cycles of several nanometers to several millimeters, based on phase separation such as spinodal decomposition or binodal decomposition); thus, the hydroxyl groups between cellulose acylate molecules easily come close to each other in the high-concentration phase, so that hydrogen bonds are easily caused. Preferably such phase separation is caused at the temperature when the dope is cast. The phase separation can be analyzed or estimated by measuring the absorbance of the dope, for example, at 40° C. The separated phases are converted to a homogeneous phase by a change in the temperature of the system. Therefore, the phase separation can be estimated by the rise ratio of the absorbance at 40° C. to the absorbance at temperatures ranging from 0 to −40° C., at which cellulose acylate turns into a homogeneous phase. In the first embodiment of the present invention, cellulose acylate is dissolved in a solvent. The phenomenon that, at this time, domains (phase) where the concentration of the cellulose acylate is high, and domains (phase) where it is low, are produced, is referred to as "phase separation."

The absorbance of the dope to a wavelength of 550 nm at 40° C. (A40) is preferably 0.02 to 3 (inclusive), more preferably 0.02 to 2 (inclusive), even more preferably 0.02 to 1 (inclusive) higher than the minimum absorbance thereof to the wavelength of 550 nm at temperatures ranging from 0 to −40° C. (Am). The Am is preferably from 0 to 0.3 (inclusive), more preferably from 0.01 to 0.25 (inclusive), even more preferably from 0.02 to 0.2 (inclusive).

The ease of formation of such hydrogen bonds is controlled by the activity of the hydroxyl groups. That is, as the activity is higher, hydrogen bonds between cellulose acylate molecules are more easily formed, so that the strength of the dope rises more easily. A dope having low activity is one in which the hydrogen bonds are formed in the individual molecules of the cellulose acylate, and hydrogen bonds are not easily formed between the molecules.

The activity of the hydroxyl groups can be estimated by infrared spectroscopy (IR). That is, O—H stretches make their appearance in the wave number range from 3400 to 3600 $cm^{-1}$. Of these stretches, those having low wave numbers result from hydrogen bonds between the molecules, and those having high wave numbers result from free hydroxyl groups, which undergo no hydrogen bonds.

Addition of boric acid, which interacts with hydroxyl groups, to the dope enables knowing the state of hydrogen bonds in the dope. That is, when boric acid is added to the hydroxyl groups that form hydrogen bonds firmly in the individual molecules, the hydroxyl groups do not interact with boric acid, such that the signal intensity of these hydroxyl groups does not change. In contrast, the hydroxyl groups that form hydrogen bonds weakly in the individual molecules interact easily with boric acid, such that the hydrogen bonds in the molecules are cut. This fact enables knowing the intensity of the hydrogen bonds in the molecules. With greater intensity, hydrogen bonds between molecules are less easily generated.

(i) The infrared spectrum intensity ratio of a dope before the addition of boric acid, i.e., A1 (=a value obtained by dividing the absorbance of the dope to a wave number of 3552 $cm^{-1}$ by the absorbance thereof to a wave number of 3475 $cm^{-1}$), or A2 (=a value obtained by dividing the absorbance of the dope to a wave number of 3629 $cm^{-1}$ by the absorbance thereof to a wave number of 3475 $cm^{-1}$), is calculated.

(ii) The infrared spectrum intensity ratios when 1.5%, by mass, of boric acid is added to the dope, i.e., B1 (=a value obtained by dividing the absorbance of the dope to a wave number of 3552 $cm^{-1}$ (corresponding to free hydroxyl groups) by the absorbance thereof to a wave number of 3475 $cm^{-1}$ (corresponding to hydroxyl groups subjected to hydrogen bonds in individual molecules), or B2 (=a value obtained by dividing the absorbance of the dope to a wave number of 3629 $cm^{-1}$ (corresponding to free hydroxyl groups) by the absorbance thereof to a wave number of 3475 $cm^{-1}$), are calculated.

(iii) The change in the intensity ratio before and after the addition of boric acid (i.e. the ratio between the absorbance to 3552 $cm^{-1}$ and that to 3475 $cm^{-1}$, or the ratio between the absorbance to 3629 $cm^{-1}$ and that to 3475 $cm^{-1}$) is calculated from expressions described below. The added amount of boric acid is preferably 1.5% by mass of the cellulose acylate in the dope. This means that the mol number of boric acid is about 2-10 times larger than that of the hydroxyl groups in the cellulose acylate. That is, the amount of boric acid is necessary and sufficient for that of the hydroxide groups.

The infrared spectrum intensity ratio in the first embodiment of the present invention preferably satisfies the following expressions (A) and (B).

$$3.0 \geq B1/A1 \geq 1.2 \qquad \text{Expression (A)}$$

$$3.0 \geq B2/A2 \geq 1.2 \qquad \text{Expression (B)}$$

The intensity ratio more preferably satisfies the following expressions (A') and (B').

$$2.9 \geq B1/A1 \geq 1.25 \qquad \text{Expression (A')}$$

$$2.9 \geq B2/A2 \geq 1.25 \qquad \text{Expression (B')}$$

The intensity ratio even more preferably satisfies the following expressions (A'') and (B'').

$$2.8 \geq B1/A1 \geq 1.3 \qquad \text{Expression (A'')}$$

$$2.8 \geq B2/A2 \geq 1.3 \qquad \text{Expression (B'')}$$

In the dope having large ratios B1/A1 and B2/A2, that is, the dope wherein a lot of free hydroxyl groups are generated by the addition of boric acid, the activity of the hydroxyl groups in the dope is high so that hydrogen bonds are easily formed between the cellulose acylate molecules in the dope. In such a dope, the intensity thereof is easily raised by the hydrogen bonds between the molecules.

To form such hydrogen bonds between cellulose acylate molecules, it is important that the molecules be dissolved in a spreading manner such that the cellulose acylate molecules do not form hydrogen bonds between the molecules in the dope so as not to be a shrink structure. In this case, the hydroxyl groups are directed to the outside of the molecules. This enables the hydroxyl group of one molecule of cellulose acylate to combine with the hydroxyl group of another molecule thereof to form a hydrogen bond.

Such a dope can be prepared as follows:

(1) Collected wastes of cellulose acylate are added.

Collected wastes are wastes obtained by collecting and crushing a cellulose acylate film edge trimmed when raw material of the film is cast. The collected wastes are again added to a dope-producing system when a dope is produced. The added amount thereof is preferably from 5 to 60% (inclusive), more preferably from 10 to 55% (inclusive), and even more preferably from 15 to 50% (inclusive) by weight of the whole of the cellulose acylate.

The reason adding the collected wastes causes an improvement in the solubility of the cellulose acylate can be presumed to be as follows. Since the collected wastes once receive large shearing stress in a kneader, the molecular weight of the cellulose acylate of the collected wastes is lowered, so that cellulose acylate molecules wherein acetyl groups are hydrolyzed are partially present in all of the cellulose acylate; these cellulose acylate molecules, which are of lower molecular weight, which makes their polarity high, act as a surfactant to disentangle shrunken molecules of the cellulose acylate, thereby improving the solubility of the cellulose acylate.

(2) The cellulose acylate is cooled, and is heated, stepwise, to dissolve the cellulose acylate.

It is known that the dissolution of cellulose acylate is advanced by cooling it once and subsequently heating it. A known method to attain this industrially and continuously is that of kneading and mixing cellulose acylate at a low temperature in a screw-shaped kneading extruder, the periphery of which is covered with a coolant, as described in JP-A-10-324774. The present invention has discovered that heating cellulose acylate stepwise improves the solubility thereof dramatically in the range of ambient temperatures (band casting temperature range). The multi-step heating is preferably performed at 2 to 10 steps, more preferably at 2 to 6 steps, even more preferably at 2 to 4 steps. About the temperatures for the heating, the temperature of the downstream side (outlet side) of each of the steps is made higher than that of the upstream side (inlet side) thereof preferably by 5 to 30° C. (inclusive), more preferably by 7 to 25° C. (inclusive), even more preferably by 10 to 20° C. (inclusive). The time necessary for the whole of heating zones is preferably from 2 to 120 minutes (inclusive), more preferably from 3 to 60 minutes (inclusive), even more preferably from 5 to 30 minutes (inclusive). By dividing this time appropriately, time when the cellulose acylate stays in each of the steps may be set.

Such multi-step heating can be attained by dividing a temperature-adjusting jacket arranged around the screw, and sending coolants having different temperatures into each of the divided sections.

The reason the solubility of the cellulose acylate is improved by heating it stepwise as described above is presumed to be as follows. The heating of the dope is followed by volume expansion thereof; that is, gaps (free volume) between the molecules expand. When the dope is abruptly heated in only one step, the stretch of the cellulose acylate molecules cannot follow the volume expansion. As a result, the stretch of chains of the molecules cannot follow the volume expansion. Thus, the molecules are heated up to room temperature while they are shrunken. Since a firm hydrogen bond is present in each thus-shrunken molecule, the strength of the dope cannot be made high by hydrogen bonds between the molecules. On the other hand, when the dope is heated stepwise, the molecule chains are sufficiently stretched each time the dope is kept at a given temperature in the middle of the heating. Consequently, the hydrogen bonds in the individual molecules can be cut. As a result, the dope strength can be improved by the hydrogen bonds between the molecules.

The present inventors have intensively studied to enhance elastic modulus at the time of peeling the film-like dope in the drum cast method which comprises the steps of casting a dope onto a chilled drum to gel, and then peeling the gelled dope from the drum. As a result, they have found it effective to use a dope from which a characteristic diffraction peak is obtained in crystal analysis according to X-ray diffraction (XD). In other words, they have found that as a result of developing such crystals from a dope, junctions are formed by the crystals to accelerate gelling the dope, so that elastic modulus can be enhanced. They have further continued studying on the basis of these findings, and have made the second embodiment of the present invention.

Because growth of crystals in the dope is easy to progress at a low temperature, X-ray diffraction is preferably conducted while cooling at −50° C. In this measurement, it is preferable that a diffraction peak (A) whose full width at half maximum is from 0.1 degree to 2 degrees appears in the range of from 2θ=20 degrees to 2θ=25 degrees. A signal with such small full width at half maximum is indicative of the crystals to be uniform in size and to have a regular structure. The presence of these crystals is needed to enhance elastic modulus. A relative intensity of such diffraction peak (i.e., a value of an intensity of the diffraction peak (A) divided by intensity of a peak appearing in the range of from 2θ=26 degrees to 2θ=27 degrees of 6 μm PET (polyethyleneterephthalate) according to the internal standard method) is preferably in the range of from 0.05 to 2, more preferably in the range of from 0.1 to 1.5, and furthermore preferably in the range of from 0.1 to 1.

It is further preferable that a diffraction peak (B) whose full width at half maximum is from 3 degrees to 20 degrees appears in the range of from 2θ=15 degrees to 2θ=28 degrees. Crystals having such broad full width at half maximum are not so high in regularity, but contribute to enhancement of elastic modulus, even though the effect is inferior to the aforementioned diffraction peak (A).

A ratio in peak intensity of the diffraction peak (A) to the diffraction peak (B) ((A)/(B)) is preferably in the range of from 0.05 to 1, more preferably in the range of from 0.07 to 0.7, and furthermore preferably in the range of from 0.08 to 0.5. These XD values are those obtained under measuring conditions of the dope having a concentration of 15% by mass.

In order to obtain such good relations of the diffraction peaks, an absorbance of 550 nm at −50° C. is higher by the range of, preferably from 0.01 to 3, more preferably from 0.01 to 2, and furthermore preferably from 0.02 to 1, than the minimum absorbance (Am) of 550 nm in the range of from 0° C. to −40° C. respectively. The Am is preferably in the range of from 0 to 0.5, more preferably from 0.01 to 0.4, and furthermore preferably from 0.02 to 0.3. These values of absorbance are those obtained under measuring conditions of the dope having a concentration of 15% by mass.

Such increase in absorbance by cooling is originated from the occurrence of both a phase separation of the dope and the resulting fluctuation of concentration (owing to a phase separation such as spinodal decomposition and binodal decomposition, a high concentration region and a low concentration region appear reciprocally in a cycle of from several nm to several mm). That is, it is assumed that local thickening of the dissolved cellulose acylate is caused by the fluctuation of concentration, and thereby growth of crystals is accelerated, which results in occurrence of the diffraction peak as described above.

As a result, according to the second embodiment of the present invention, a temperature at which tanδ (a value of G'' (Viscous Modulus) divided by G' (Elastic Modulus)) of not more than 1 is obtained when a cellulose acylate-based dope is measured in a closed system may be set in the range of from −80° C. to 15° C. The temperature is preferably in the range of from −70° C. to 0° C., more preferably from −60° C. to −10° C.

G' at the temperature to give tanδ of 1, when measured in a closed system, can be set in the range of from 400 Pa to 4,000 Pa. G' is preferably in the range of from 600 to 3,500 Pa, more preferably from 800 to 3000 Pa.

Further, an increasing ratio (ΔG') of G' at a temperature of from 10° C. to −35° C. measured in a closed system is preferably in the range of 5 Pa/° C. to 300 Pa/° C., more preferably in the range of 10 Pa/° C. to 200 Pa/° C., and further more preferably in the range of 15 Pa/° C. to 100 Pa/° C.

The term "tanδ when measured in a closed system" that is used in the present invention means a value obtained by measurement of viscoelasticity of the dope in a hermetically sealed container. Previously, the viscoelasticity of the dope is generally measured by injecting a dope into a definite space left between a couple of plates set parallel to each other, and thereafter applying a sine wave to one of the plates for analysis (for example, a method of measurement using a rheometer (CLS 500) as described in JIII (Japan Institute of Invention and Innovation) Kokai gihou. However, because of the followings, it was difficult to precisely evaluate viscoelasticity of the dope according to the method. That is, a solvent volatilizes from the space between the plates, so that it is inevitable to measure the viscoelasticity including increase of viscoelasticity originated from volatilization of the solvent. Thereby a value much higher than the intrinsic one was obtained. On the other hand, in the present invention, enclosure of the circumference of the plates with a hermetically sealed container made it possible to evaluate precisely and exclusively improved degrees of gel strength owing to crystallization of the dope. Namely, in the previous dopes, when measured in a closed system, a temperature at which tanδ of not more than 1 is obtained is always below the temperature range of the second embodiment of the present invention and G' is outside the second embodiment of the present invention. These tanδ and G' that are used in the present invention are those obtained under measuring conditions of the dope having a concentration of 15% by mass.

Control of the values of tans and G', thus measured by a method without drying according to the present invention, within the ranges of the second embodiment of the present invention enabled to enhance elastic modulus at the time of peeling the dope. Namely, in the method of accelerating gelation of a dope at a low temperature for peeling which the present invention is aiming principally, volatilization of a solvent seldom occurs. The previous dopes, even though large values of tanδ and G' were obtained according to the previous method, were unable to attain a sufficient gel strength, so that peeling inadequacy occurred. On the other hand, the dope of the second embodiment of the present invention has a great advantage that because gel strength is enhanced without volatilization, a gel of extremely high strength can be prepared and thereby a peeling property has been improved.

These cellulose acylate dopes of the second embodiment are attained according to the methods described below.

(1) A recovery solvent in a solution film production of cellulose acylate is used.

In the solution film production, a solvent in the dope is volatilized to form a film. It is preferable that the volatile solvent is recovered to use it again as a solvent for the dope. After recovery, the solvent is subjected to fractional distillation before use. It is assumed that a part of solvent is decomposed at the time of fractional distillation, and the resulting decomposition products attain effects of the present invention. It is further assumed that generally a majority of the decomposition products are oxides (organic acids), and inclusion of said acids into a solvent accelerates dissolution of cellulose acylate that is a polymer having a relatively high polarity. Namely, in case of methyl acetate that is an especially preferable solvent, acetic acid and methanol are generated upon hydrolysis and subsequently methanol is oxidized and turned to formic acid. In case of alcohols such as methanol, ethanol and butanol to be used as an auxiliary solvent besides methyl acetate, these are oxidized and turned to formic acid, acetic acid and butyric acid. In a solvent having a high solubility, a distance between terminal groups of cellulose acylate is broadened, so that a molecular chain is easy to become a state of having done stretching enough. A solution of cellulose acylate having been done in such state becomes easy to interact with other cellulose acylate molecules. As a result, generation of crystals becomes easy. In contrast, if the distance between terminal groups is lessen so that a molecule is shrunk, intermolecular interaction hardly occurs and thereby generation of crystals becomes difficult.

The above-mentioned effects are particularly remarkable when acetic acid esters are used as a solvent. Methyl acetate is especially effectively used. It is assumed that effectiveness of methyl acetate is attained by the reason as described below.

When acetic acid esters are used, a part of the ester decomposes during recovery, and then acetic acid generates. In case of the cellulose acylate being cellulose acetate, said cellulose acetate has especially high affinity with acetic acid because the cellulose acetate is an acetic acid ester.

These oxides such as acetic acid are contained in a recovered solvent preferably in the proportion of from 10 ppm to 5000 ppm, more preferably from 20 ppm to 1000 ppm.

The solvent may be recovered by a method including the steps of sealing hermetically a film-producing machine with a casing, outputting a solvent vapor from the machine, passing the vapor through a freezer for condensation and recovery, followed by fractional distillation before use. Dopes are prepared using the thus-recovered solvent. A percentage of the recovered solvent occupying in an entire solvent is preferably in the range of from 20% to 100%, more preferably in the range of from 25% to 90%, and furthermore preferably in the range of from 30% to 80%. If the percentage of the recovered solvent is too small, both the uneven thermal shrinkage and the optical unevenness become remarkable.

The use of a recovered solvent is especially effective to obtain X-ray diffraction peaks according to the second embodiment of the present invention.

(2) Cellulose acylate is subjected to a swelling treatment before dissolution.

In order to increase a solubility of the dope, it is preferable to swell cellulose acylate before use. The swelling means an operation of dipping cellulose acylate with a partial amount of or a whole amount of the solvent used. An amount of the solvent used is preferably in the range of from 30 to 100% by volume, more preferably in the range of from 40 to 100% by volume, and furthermore preferably in the range of from 50 to 100% by volume, of the whole amount of the solvents used. In case of a mixed solvent, the solvent of the whole composition or a partial composition may be used. The remaining solvent that has not been added yet in the swelling step may be added after swelling, or may be added during a subsequent dissolution step, or after the dissolution step.

During swelling, it is preferable that a mixture of cellulose acylate and a solvent stands with no agitation etc. In the previous method, swelling was generally carried out at a definite temperature within the range of from 0° C. to 60° C. during the swelling step. On the contrary, it is preferable in the present invention to swell by two or more stages of temperature different from each other. More minutely, it is preferable in the present invention to swell by the first stage at a temperature of from 10° C. to 30° C., and thereafter by at least one additional stage of a fixed temperature selected from the range higher by the degree of from 3° C. to 30° C. than the temperature of the first stage. If a swelling temperature is not changed but kept constant during the swelling step, both the uneven thermal shrinkage and the optical unevenness become remarkable.

A swelling time is preferably in the range of from 0.1 to 100 hours, more preferably in the range of from 0.2 to 50 hours, and furthermore preferably in the range of from 0.5 to 30 hours.

The aforementioned swelling step is particularly effective to attain a preferable absorbance specified in the second embodiment of the present invention.

(3) The dope is multistage-cooled during cooling/heat-up dissolution.

In order to increase solubility of the prepared dope, it is preferable in the present invention to swell cellulose acylate with a solvent, and then to cool the resulting mixture down to a temperature of from −20° C. to −100° C., more preferably from −30° C. to −90° C., and furthermore preferably from −35° C. to −80° C., and thereafter to rise a temperature again so as to give back to a room temperature (cooling/heat-up dissolution). In the case that the cooling/heat-up dissolution is carried out on an industrial scale, it is preferable to agitate with applying a shearing force between extrusion screws chilled with a refrigerant. Particularly in the present invention, it is preferable to divide the screw into the multistage of from 2 to 10 stages, more preferably from 2 to 6 stages, furthermore preferably from 2 to 4 stages, and to lower stepwise a temperature from upstream to downstream. It is assumed that dissolution is accelerated by the method, resulting in promotion of the aforementioned crystal formation. Namely, in case of the cooling heat-up dissolution, the lower the cooling temperature, the more the dissolution proceeds (equilibrium solubility becomes greater), but the time necessary for dissolution becomes longer. On the other hand, if a cooling temperature is high, the time necessary for dissolution is saved, but the dissolution is not enough. In contrast, if the multistage cooling is done stepwise as in the present invention, solubility can be increased and also the time necessary for dissolution can be saved.

The multistage cooling is preferably done at the stages of from 2 to 10, more preferably from 2 to 6, and furthermore preferably from 2 to 4. A cooling temperature at the most downstream side (outlet side) is lowered than at the most upstream side (inlet side) by the degree of preferably from 5° C. to 30° C., more preferably from 7° C. to 25° C., and furthermore preferably from 10° C. to 20° C. When the cooling is done at three or more multi-stages, it is preferable that the temperature at the downstream side is always lowered than at the upstream side. It is further preferable to differentiate cooling temperatures between both sides.

Such multistage cooling can be accomplished by a method of dividing cooling jackets disposed at the neighborhood of the screw and passing a refrigerant of a different temperature in each jacket.

The multistage cooling is remarkably effective to prevent from occurrence of both uneven thermal shrinkage and optical unevenness.

The multistage cooling is useful for both obtaining of X-ray diffraction peaks and the achievement of absorbance according to the second embodiment of the present invention.

Further in the second embodiment of the present invention, it is preferable for enhancement of elastic modulus at the time of peeling a dope that two or more peaks exist in a distribution curve of diffusion constant at −50° C., in which the absolute value ($\Delta \log D$) of a difference in natural logarithm of diffusion constant between the highest peak and the secondly highest peak of these peaks is within the range of preferably from 0.5 to 8, more preferably from 0.7 to 7, and further more preferably from 1 to 6. The existence of two or more peaks in a distribution curve of diffusion constant at −50° C. that is a peeling temperature indicates that there are, in the dope, two or more regions different from each other in mobility. Namely, the cellulose acylate of the temperature at which a dope is dissolved and cast, is dispersed homogeneously in a solvent, and therefore it has only one diffusion constant. However, in order to gelate the cellulose acylate at the peeling temperature, it is preferable to cross-link these cellulose acylate molecules. Owing to occurrence of such cross-linkage (network), uncross-linked cellulose acylate molecules become hard to diffuse through the network, which results in a reduction in diffusion constant. On the other hand, even though a whole molecular chain of the cellulose acylate molecules already forming the network becomes hard to diffuse, a minute movement of segments begins between cross-linking points. Because such movement of segments is fast, the diffusion constant increases. As a result, plural diffusion constants generate according to gelation (cross-link). So long as a degree of gelation is low, a difference in diffusion constant between them is small. However, as the cross-link progresses, the difference becomes larger and elasticity increases, so that a cellulose acylate film becomes easier to be peeled off.

It is assumed that the aforementioned cross-link is generated by a mechanism that glucopyranose rings of the cellulose acylate are contacted with each other to form a hydrogen bond. Such behavior can be observed by IR (infrared) spectrum, and can be realized by a change in intensity of a signal originating from an ether bond of the glucopyranose ring at the neighborhood of 1056 cm$^{-1}$ (a peak having the maximum absorbance appearing between 1056±10 cm$^{-1}$). A ratio of absorbance (Abs(1056)) at the neighborhood of 1056 cm$^{-1}$ to absorbance (Abs(1753)) of a standard peak at the neighborhood of 1753 cm$^{-1}$ originating from a carboxyl group of the acylate group (a peak having the maximum absorbance appearing between 1056±10 cm$^{-1}$), i.e., I=(Abs(1056))/(Abs(1753)), increases as gelation owing to reduction in temperature progresses. Accordingly, it is preferable that a value of I at −50° C. at which gives gelation (I(−50)) is larger than a value of I at 25° C. (I(25)) by the range of from 0.1 to 1.5, more preferably from 0.2 to 1.2, and furthermore preferably from 0.3 to 1. On account that such change of IR spectrum is determined by a basic structure of cellulose acylate, it is a point that the IR spectrum relatively changes with temperature as mentioned above without distinction of a solvent for use in measurement. However, it is difficult to measure IR spectra in a solvent having a signal overlapping with that of the cellulose acylate. Therefore, values that are obtained by measurement in dichloromethane are used in the present invention as mentioned later.

These cellulose acylate-based dopes of the second embodiment of the present invention are attained by the method (1) as described below, and the effects thus obtained by the method (1) are further synergistically increased in the combination with the method (2).

(1) Control of Distribution of Substitution Degree in the 6-Position of Cellulose Acylate In the present invention, it is preferable that the sum total (S6) of a substitution degree of the aforementioned SA and SB in the 6-position of the cellulose acylate satisfies formula (IV), more preferably formula (IV'), and furthermore preferably formula (IV''), each described below.

$$0.8 \leq S6 \leq 1 \quad \text{(IV)}$$

$$0.82 \leq S6 \leq 0.98 \quad \text{(IV')}$$

$$0.84 \leq S6 \leq 0.95 \quad \text{(IV'')}$$

Synthesis methods of these cellulose acylates having such large degree of substitution in the 6-position thereof are described in, for example, JP-A-11-5851, JP-A-2002-212338 and JP-A-2002-338601.

Thus, by increasing the degree of substitution in the 6-position, a hydrogen bond between those cellulose acylates can be decreased. If there is a hydrogen bond, these cellulose acylates can be drawn toward each other up to a length of hydrogen bond. Instead, attempt to bring them close each other up to a distance necessary to gelation owing to a hydrophobic bond rather fails to shorten the distance any more. This results in a hindrance to progress of the aforementioned gelation. Mobility of the hydroxyl group bonding to the 6-position of the glucopyranose ring via a methylene group is highest, so that a hydrogen bond is easy to be formed. Therefore, the increase in a degree of substitution of the acyl group in the position as described above is important.

(2) Addition of Agents for Cleaving a Hydrogen Bond

Formation of a hydrogen bond between cellulose acylates can be prohibited by addition of agents that are capable of coordinating around the hydrogen bond. As the agents, there are illustrated organic compounds having a hydroxyl group (e.g., urea) and ionizable inorganic compounds (e.g., LiCl, NaCl, CaCl$_2$, CaCO$_3$). Of these materials, monovalent inorganic salts are more preferable. This is because some multi-valent ions are capable of forming plural hydrogen bonds between hydroxyl groups of cellulose acylates. Beside, many of the organic salts have a larger molecular structure than in organic salts, and even though a hydroxyl group of the cellulose acylate is successfully masked with the organic salt, rather the organic salt added sometimes results in steric hindrance that affects the formation of a hydrophobic bond between glucopyranose rings. Accordingly, of the monovalent inorganic salts that are more preferable, LiCl having a small ionic radius is further more preferable.

These salts are preferably added in an amount ranging from 0.5 to 50 times by mole, more preferably from 1 to 30 times by mole, and furthermore preferably from 4 to 20 times by mole, of the hydroxyl group of the cellulose acylate respectively. The number of moles of the hydroxyl group per unit mass of the cellulose acylate is a value of (the total mass of cellulose acylate/1 mass of segment)×{the number of the hydroxyl group per 1 segment of the cellulose acylate (i.e., the number=3 minus degree of substitution of total acyl groups)}.

The aforementioned agents may be added in any stage during preparation of the dope. Further, they may be added by online during the period up to the cast after preparation of the dope.

The following describes the present invention in more detail along steps in which the invention is carried out.

(Cellulose Acylate)

The cellulose acylate used in the invention is not particularly limited as far as the acylate exhibits the advantageous effects of the invention.

In the invention, a mixture of two or more kinds of different cellulose acylate may be used. However, cellulose acylates preferred as materials for the substrate for use in the present invention are described below in detail. That is, with respect to the degree of substitution for hydroxyl groups of cellulose, cellulose acylates satisfying all of the relations (1) to (3) defined below are used to advantage:

$$2.6 \leq SA+SB \leq 3.0 \quad (1)$$

$$2.0 \leq SA \leq 3.0 \quad (2)$$

$$0 \leq SB \leq 0.8 \quad (3)$$

in these relations, SA and SB represent degrees of substitution of acyl groups for hydroxyl groups of cellulose, and more specifically SA is the degree of acetyl substitution and SB is the degree of acyl substitution having 3 to 22 carbon atoms.

It is preferable, in the first embodiment of the present invention, that the cellulose acylate is made of fresh cellulose acylate, which has not yet been made into a film, to which the collected wastes are added.

In the second embodiment of the present invention, with respect to the degree of substitution for hydroxyl groups of cellulose, it is more preferable that cellulose acylates satisfies all of the relations (I') to (III') defined below;

$$2.65 \leq SA+SB \leq 2.95 \quad (I')$$

$$2.2 \leq SA \leq 2.95 \quad (II')$$

$$0 \leq SB \leq 0.5 \quad (III')$$

and further preferable that cellulose acylates satisfies all of the relations (I") to (III") defined below;

$$2.7 \leq SA+SB \leq 2.95 \quad (I'')$$

$$2.4 \leq SA \leq 2.95 \quad (II'')$$

$$0 \leq SB \leq 0.3 \quad (III'')$$

Each of the glucose units which constitute cellulose, having a β-1,4 bond, has free hydroxyl groups at the 2-, 3- and 6-positions thereof. Cellulose acylate is a polymer obtained by esterifying a part or the whole of these hydroxyl groups with acyl groups. The acyl substitution degree of cellulose means the rate of esterified hydroxyl groups at the 2-, 3- and 6-positions in the cellulose. The 100% esterification of any one of the positions is a substitution degree of 1. The 100% esterification of the three positions is a substitution degree of 3. In the present invention, the total of the SA and SB in the hydroxyl groups is more preferably from 2.7 to 2.96, even more preferably from 2.80 to 2.95. The SB is preferably from 0 to 0.8, more preferably from 0 to 0.6. Preferably, 28% or more of the acyl groups having 3 to 22 carbon atoms is made of substitutents of the hydroxyl groups at the 6-positions. More preferably, 30% or more thereof, even more preferably 31% or more thereof, even more preferably 32% thereof is made of the same substitutents. The total of the SA and the SB in the hydroxyl groups at the 6 positions in the cellulose acylate is preferably 0.8 or more, more preferably 0.85, even more preferably 0.90. From the cellulose acylate referred to herein, a solution which exhibits a preferable solubility of the cellulose acylate can be produced, and a good solution containing, in particular, chlorine-free organic solvent can be produced.

The acyl group having 3 to 22 carbon atoms in the cellulose acylate used in the invention is not particularly limited, and may be an aliphatic group or an aryl group. Examples of the cellulose acylate having the acyl group include alkylcarbonyl esters, alkenylcarbonyl esters, aromatic carbonyl esters, and aromatic alkylcarbonyl esters of cellulose. These may further have a substitutent. Preferable examples of the acyl group having 3 to 22 carbon atoms include propionyl, butanoyl, heptanoyl, hexanoyl, octanoyl, decanoyl, dodecanoyl, tridecanoyl, tetradecanoyl, hexadecanoyl, octadecanoyl, iso-butanoyl, t-butanoyl, cyclohexanecarbonyl, oleoyl, benzoyl, naphthylcarbonyl, and cinnamoyl groups. Of these groups, propionyl, butanoyl, dodecanoyl, octadecanoyl, t-butanoyl, oleoyl, benzoyl, naphthylcarbonyl, and cinnamoyl groups are more preferred.

A basic principle of the synthesis method of cellulose acylate is described in Migita et al., "Wood Chemistry", 180-190 (published by Kyoritsu Shuppan Co., Ltd. in 1968). A typical synthesis method thereof is a liquid-phase acetylating method by use of carboxylic acid anhydride/acetic acid/a sulfuric acid catalyst. Specifically, a cellulose material such as cotton linter or wood pulp is subjected to pretreatment with an appropriate amount of acetic acid, and subsequently a carboxylic acid mixed liquid which is beforehand cooled is poured into the pre-treated solution to esterify the cellulose, thereby synthesizing complete cellulose acylate (the total of the acyl substitution degrees at the 2-, 3- and 6-positions is about 3.00). The carboxylic acid mixed liquid generally contains acetic acid as a solvent, carboxylic acid anhydride as an esterification agent, and sulfuric acid as a catalyst. The carboxylic acid anhydride is usually used in a stoichiometrically excessive amount over the total amount of cellulose which reacts with the anhydride and water present in the present system. After the end of acylation reaction, an aqueous solution of a neutralizing agent (such as a carbonate, an acetate or an oxide of calcium, magnesium, iron, aluminum or zinc) is added to the system in order to hydrolyze excessive carboxylic acid anhydride which remains in the system and neutralize a part of the esterifying catalyst which remains in the system. Next, the resultant complete cellulose acylate is kept at 50 to 90° C. in the presence of a small amount of an acetizing reaction catalyst, which is generally remaining sulfuric acid. In this way, the cellulose acylate is saponified and ripened so as to be converted to cellulose acylate having desired acyl substitution degree and polymerization degree. When the desired cellulose acylate is obtained, the cellulose acylate solution is poured into water or dilute sulfuric acid (or water or dilute sulfuric acid is poured into the cellulose acylate solution) with or without neutralizing the catalyst remaining in the system with a neutralizing agent as described above, thereby separating the cellulose acylate. This is washed and subjected to stabilizing treatment to yield final cellulose acylate.

Further, as mentioned above, in the present invention, 28% or more of SB is made of substitutents of the hydroxyl groups at the 6-positions. More preferably, 30% or more thereof, even more preferably 31% or more thereof, even more preferably 32% thereof is made of the same substitutents. Cellulose acylates having the total of the SA and the SB in the hydroxyl groups at the 6 positions in the cellulose acylate is preferably 0.8 or more, more preferably 0.85, even more preferably 0.90, can be included. The synthesis of the cellulose acylate having a large substitution, degree at the 6-positions is described in JP-A-11-5851, 2002-212338 and 2002-338601.

The suitable polymerization degree (viscosity average) of cellulose acylate preferably used in the present invention is generally from 200 to 700, preferably from 250 to 550, further preferably from 250 to 400, and particularly preferably from 250 to 350. The average polymerization degree can be measured by a limiting viscosity method by Uda et al., (Kazuo Uda and Hideo Saito, "The Journal of the Society of Fiber Science and Technology, Japan", vol. 18, No. 1, 105-120, 1962). The method is described in detail in JP-A-9-95538.

If low molecular weight components are removed from the cellulose acylate, the average molecular weight (polymerization degree) thereof becomes high. However, the viscosity thereof becomes lower than that of ordinary cellulose acylate. Thus, the removal is useful. Cellulose acylate containing low molecular weight components at a small ratio can be obtained by removing the low molecular weight components from cellulose acylate synthesized by an ordinary method. The removal of the low molecular weight components can be carried out by washing the cellulose acylate with an appropriate organic solvent. When the cellulose acylate containing a small amount of the low molecular weight components is produced, the amount of the sulfuric acid catalyst in the acetizing reaction is preferably adjusted to 0.5 to 25 parts by mass for 100 parts by mass of the cellulose. When the amount of the sulfuric acid catalyst is set into this range, cellulose acylate having a preferable molecular weight distribution (uniform molecular weight distribution) can be synthesized.

About the cellulose acylate used in the present invention, the starting cotton thereof and the synthesis method thereof are described in detail in "Kokai Gifo of Japan Institute of Invention & Innovation" (Kogi No. 2001-1745, published on Mar. 15, 2001), pp. 7-12.

Preferably, the cellulose acylate in the present invention consists substantially of the cellulose acylate defined above. This means that 55% or more, preferably 70% or more, more preferably 80% or more by mass of the polymer components which constitute the cellulose acylate in the present invention consists of the cellulose acylate defined above.

In the case that the cellulose acylate is used when the cellulose acylate film of the present invention is produced, the percentage of water content in the cellulose acylate is preferably 2% or less, more preferably 1% or less, even more preferably 0.7% or less by mass. It is known that cellulose acylate generally contains 2.5 to 5% by mass of water. Thus, in order to set the percentage of water content in the cellulose acylate in the present invention within this range, it is necessary to dry ordinary cellulose acylate. The method for the drying is not particularly limited as far as the target percentage of water content can be obtained.

In order to improve the solubility of the cellulose acylate, the cellulose acylate used is preferably in the form of particles. It is preferable that 90% or more by mass of the used particles has a particle size of 0.5 to 5 mm and 50% or more by mass of the used particles has a particle size of 1 to 4 mm. The shapes of the cellulose acylate particles are preferably made as completely spherical as possible.

(Additives)

Various additives (for example, a plasticizer, an ultraviolet absorber, a deterioration inhibitor, an optical anisotropy controller, fine particles, a releasing agent, an infrared absorber, and a surfactant) may be added to the cellulose acylate solution (i.e., the dope) of the present invention in each step in the process for the preparing the solution in accordance with the purpose of the solution. The addition may be performed at any time of the dope-producing process. As a final step of the dope-producing process, the step for adding the additives may be added. The added amount of each of the additives is not particularly limited as far as the function thereof is exhibited. The plasticizer may be, for example, one described in JP-A-2001-151901, and is preferably incorporated at a ratio of 0.1 to 25% by mass of the cellulose acylate. The infrared absorbent may be, for example, one described in JP-A-2001-194522, and the ultraviolet ray absorbent may be, for example, one described in JP-A-2001-151901. Each of them is preferably incorporated at a ratio of 0.001 to 5% by mass of the cellulose acylate. The fine particles may be preferably ones having an average particle size of 5 to 3000 nm, and may be made of metal oxide or crosslinked polymer. The fine particles are preferably incorporated at a ratio of 0.001 to 5% by mass of the cellulose acylate. The releasing agent is preferably incorporated at a ratio of 0.0001 to 2% by mass of the cellulose acylate. The deterioration inhibitor is preferably incorporated at a ratio of 0.0001 to 2% by mass of the cellulose acylate. The optical anisotropy controller may be, for example, one described in JP-A-2003-66230 or 2002-49128, and is preferably incorporated at a ratio of 0.1 to 15% by mass of the cellulose acylate. The surfactant is preferably a fluorine-containing surfactant, and is preferably incorporated at a ratio of 0.001 to 2% by mass of the cellulose acylate.

These materials, which are favorably used in the present invention, are described in detail in "Kokai Gifo of Japan Institute of Invention & Innovation" (Kogi No. 2001-1745, published on Mar. 15, 2001), pp. 16-22.

In the case where the film consists of two or more layers, the kind and the amount of additives in each layer may be different. These are described in, for example, JP-A-2001-151902, and are techniques known in the prior art.

(Solvent)

In the present invention, the following chlorine-free solvent or chlorine-containing solvent may be used. Preferably, chlorine-free solvent is used.

In the second embodiment of the present invention, it is preferable to use recovery solvents as mentioned above. After recovery from the production process, these recovery solvents are subjected to fractional distillation and the resulting separated solvents are mixed in the aforementioned proportion before use. This method is effective whether the solvent is a non-chlorine solvent or a chlorine solvent. However, the non-chlorine solvent is more effective.

In the preparation method of a dope in which the aforementioned mixed solvent is used, a cellulose acylate may be added to a previously mixed solvent of a recovery solvent and a fresh solvent. Alternatively, a recovery solvent may be mixed with a solution of a cellulose acylate dissolved in a fresh solvent.

(1) Chlorine-Free Solvent

In the invention, the above-mentioned cellulose acylate is dissolved in a solvent to produce a dope. As this solvent, chlorine-free solvent is preferably used. Preferred examples of the organic solvent include an ester having 3 to 12 carbon atoms, a ketone having 3 to 12 carbon atoms, and an ether having 3 to 12 carbon atoms. The ester, the ketone or the ether may have a cyclic structure. A compound having two or more functional groups of ester, ketone or ether (—O—, —CO— or —COO—) is also usable as the solvent. The solvent may have other functional groups such as alcoholic hydroxyl. If the solvent is the compound having two or more functional groups, the number of carbon atoms is in any of the above ranges. Examples of the ester having 3 to 12 carbon atoms include ethyl formate, propyl formate, pentyl formate, methyl acetate, ethyl acetate, and pentyl acetate. Examples of the ketone having 3 to 12 carbon atoms include acetone, methylethyl ketone, diethyl ketone, diisobutyl ketone, cyclopentanone, cyclohexanone and methylcyclohexane. Examples of the ether having 3 to 12 carbon atoms include diisopropyl ether, dimethoxymethane, dimethoxyethane, 1,4-dioxane, 1,3-dioxolan, tetrahydrofuran, anisole and phenetole. Examples of the compound having two or more functional groups include 2-ethoxyethyl acetate, 2-methoxyethanol and 2-butoxyethanol.

A preferable example of the solvent for the cellulose acylate used in the present invention is a mixed liquid composed of three or more different solvents. The first solvent is one selected from the following or a mixed solvent composed of two or more selected from the following: methyl acetate, ethyl acetate, methyl formate, ethyl formate, acetone, dioxolane, and dioxane. The second solvent is selected from ketones having 4 to 7 carbon atoms or acetoacetic acid esters. The third solvent is selected from alcohols or hydrocarbons having 1 to 10 carbon atoms, preferably alcohols having 1 to 8 carbon atoms. When the first solvent is a mixed liquid composed of two or more solvents, none of the second solvent may be used. The first solvent is preferably methyl acetate, acetone, methyl formate, ethyl formate, or a mixture thereof. The second solvent is preferably methyl ethyl ketone, cyclopentanone, cyclohexanone, methyl acetylacetate, or a mixture thereof.

The alcohol as the third solvent may be in a straight, branched, or cyclic form. In particular, the third solvent is preferably an alcohol derived from a saturated aliphatic hydrocarbon. The alcohol may be any one of primary, secondary and tertiary alcohols. Examples of the alcohol include methanol, ethanol, 1-propanol, 2-propanol, 1-butanol, 2-butanol, t-butanol, 1-pentanol, 2-methyl-2-butanol, and cyclohexanol. The alcohol may be fluorine-containing alcohol. Examples thereof include 2-fluoroethanol, 2,2,2-trifluoroethanol, and 2,2,3,3-tetrafluoro-1-propanol. The hydrocarbon may be in a straight, branched, or cyclic form. The hydrocarbon may be an aromatic hydrocarbon or an aliphatic hydrocarbon. The aliphatic hydrocarbon may be saturated or unsaturated. Examples of the hydrocarbon include cyclohexane, hexane, benzene, toluene and xylene. The alcohols and the hydrocarbons as the third solvents may be used alone or in the form of a mixture of two or more thereof. As the third solvent, examples of the preferred compound include alcohols, such as methanol, ethanol, 1-propanol, 2-propanol, 1-butanol, 2-butanol, and cyclohexanol; and hydrocarbons, such as cyclohexane, and hexane. Among these, methanol, ethanol, 1-propanol, 2-propanol, and 1-butanolmay are more preferable.

About the mixed solvent composed of the 1st to 3rd solvents, the first solvent, the second solvent and the third solvent are contained preferably at proportions of 20 to 95% by mass, 2 to 60% by mass, and 2 to 30% by mass, respectively, more preferably at proportions of 30 to 90% by mass, 3 to 50% by mass, and 3 to 25% by mass, respectively, even more preferably at proportions of 30 to 90% by mass, 3 to 30% by mass, and 3 to 15% by mass, respectively.

In the first embodiment of the present invention, when the first solvent is a mixed liquid and the second solvent is not used at all, the first solvent and the third solvent are contained preferably at proportions of 20 to 90% by mass and 5 to 30% by mass, respectively, more preferably at proportions of 30 to 86% by mass and 7 to 25% by mass, respectively.

In the second embodiment of the present invention, when the first solvent is a mixed liquid and the second solvent is not used at all, the first solvent and the third solvent are contained preferably at proportions of 70 to 90% by mass and 10 to 30% by mass, respectively, more preferably at proportions of 75 to 86% by mass and 14 to 25% by mass, respectively.

The chlorine-free organic solvents used in the present invention are described in more detail in "Kokai Gifo of Japan Institute of Invention & Innovation" (Kogi No. 2001-1745, published on Mar. 15, 2001), pp. 12-16.

Preferable examples of the combination of the chlorine-free organic solvents in the present invention are described below. However, the combination is not limited to these examples.

Methyl acetate/acetone/methanol/ethanol/butanol (75/10/5/5/5, mass parts),

Methyl acetate/acetone/methanol/ethanol/propanol (75/10/5/5/5, mass parts),

Methyl acetate/acetone/methanol/butanol/cyclohexane (75/10/5/5/5, mass parts),

Methyl acetate/acetone/ethanol/butanol (81/8/7/4, mass parts)

Methyl acetate/acetone/ethanol/butanol (82/10/4/4, mass parts)

Methyl acetate/acetone/ethanol/butanol (80/10/4/6, mass parts)

Methyl acetate/methyl ethyl ketone/methanol/butanol (80/10/5/5, mass parts),

Methyl acetate/acetone/methyl ethyl ketone/ethanol/iso-propanol (75/10/10/5/7, mass parts), Methyl acetate/cyclopentanone/methanol/iso-propanol (80/10/5/8, mass parts), Methyl acetate/acetone/butanol (85/5/5, mass parts), Methyl acetate/cyclopentanone/acetone/methanol/butanol (60/15/15/5/6, mass parts), Methyl acetate/cyclohexanone/methanol/hexane (70/20/5/5, mass parts), Methyl acetate/methyl ethyl ketone/acetone/methanol/ethanol (50/20/20/5/5, mass parts), Methyl acetate/1,3-dioxolan/methanol/ethanol (70/20/5/5, mass parts), Methyl acetate/dioxane/acetone/methanol/ethanol (60/20/10/5/5, mass parts), Methyl acetate/acetone/cyclopentanone/ethanol/iso-butanol/cyclohexane (65/10/10/5/5/5, mass parts), Methyl formate/methyl ethyl ketone/acetone/methanol/ethanol (50/20/20/5/5, mass parts), Methyl formate/acetone/ethyl acetate/ethanol/butanol/hexane (65/10/10/5/5/5, mass parts), Acetone/acetomethyl acetate/methanol/ethanol (65/20/10/5, mass parts), Acetone/cyclopentanone/ethanol/butanol (65/20/10/5, mass parts), Acetone/1,3-dioxolan/ethanol/butanol (65/20/10/5, mass parts), 1,3-Dioxolan/cyclohexanone/methyl ethyl ketone/methanol/butanol (60/20/10/5/5, mass parts)

The cellulose acylate solution can be used by the following method:

Preparation of a Solution of Cellulose Acylate, Using methyl acetate/acetone/ethanol/butanol (81/8/7/4 parts by mass), the application of filtration to the solution, the concentration of the solution, and further addition of 2 parts by mass of butanol thereto;

Preparation of a Solution of Cellulose Acylate, Using methyl acetate/acetone/ethanol/butanol (81/10/4/2 parts by mass), the application of filtration to the solution, the concentration of the solution, and further addition of 4 parts by mass of butanol thereto; and Preparation of a solution of cellulose acylate, using methyl acetate/acetone/ethanol (84/10/6 parts by mass), the application of filtration to the solution, the concentration of the solution, and further addition of 5 parts by mass of butanol thereto.

It is allowable to incorporate, into the dope used in the present technique, dichloromethane besides the above-mentioned chlorine-free organic solvent of the present technique. The amount of dichloromethane may be 10% or less by mass of all of the organic solvents.

(2) Chlorine-Containing Solvent

When the cellulose acylate dope of the present invention is produced, a chlorine-containing organic solvent is used as the main solvent as the case may be. In the invention, the chlorine-containing solvent is not particularly limited as far as the cellulose acylate can be dissolved, cast and made into a film. The chlorine-containing organic solvent is preferably dichloromethane or chloroform. Dichloromethane is particularly preferable. To incorporate, into the chlorine-containing organic solvent, any organic solvent other than the chlorine-containing organic solvent causes no problem. In this case, it is necessary to use dichloromethane at a proportion of at least 50% by mass.

A clorine-free solvent used in combination with a clorine-sereis solvent used as a main solvent in the present invention, is described below. Preferred examples of the clorine-free solvent include an ester, a ketone, an ether, an alcohol, and a hydrocarbon, each which have 3 to 12 carbon atoms. The ester, the ketone, the ether or alcohol may have a cyclic structure. A compound having two or more functional groups of ester, ketone or ether (—o—, —CO— or —COO—) is also usable as the solvent. The organic solvent may have other functional groups such as alcoholic hydroxyl. If the solvent is the compound having two or more functional groups, the number of carbon atoms is in any of the above ranges. Examples of the ester having 3 to 12 carbon atoms include ethyl formate, propyl formate, pentyl formate, methyl acetate, ethyl acetate, and pentyl acetate. Examples of the ketone having 3 to 12 carbon atoms include acetone, methylethyl ketone, diethyl ketone, diisobutyl ketone, cyclopentanone, cyclohexanone and methylcyclohexane. Examples of the ether having 3 to 12 carbon atoms include diisopropyl ether, dimethoxymethane, dimethoxyethane, 1,4-dioxane, 1,3-dioxolan, tetrahydrofuran, anisole and phenetole. Examples of the compound having two or more functional groups include 2-ethoxyethyl acetate, 2-methoxyethanol and 2-butoxyethanol.

The alcohol used in combination with the chlorine-containing organic solvent which is a main solvent, may be in a straight, branched, or cyclic form. In particular, the alcohol is preferably a saturated aliphatic hydrocarbon. The alcohol may be any one of primary, secondary and tertiary alcohols. Examples of the alcohol include methanol, ethanol, 1-propanol, 2-propanol, 1-butanol, 2-butanol, t-butanol, 1-pentanol, 2-methyl-2-butanol, and cyclohexanol. The alcohol may be fluorine-containing alcohol. Examples thereof include 2-fluoroethanol, 2,2,2-trifluoroethanol, and 2,2,3,3-tetrafluoro-1-propanol. The hydrocarbon may be in a straight, branched, or cyclic form. The hydrocarbon may be an aromatic hydrocarbon or an aliphatic hydrocarbon. The aliphatic hydrocarbon may be saturated or unsaturated. Examples of the hydrocarbon include cyclohexane, hexane, benzene, toluene and xylene.

The chlorine-free organic solvent which is used together with the chlorine-containing organic solvent is not particularly limited, but may be selected from methyl acetate, ethyl acetate, methyl formate, ethyl formate, acetone, dioxolane, dioxane, ketones and acetoacetic acid esters having 4 to 7 carbon atoms, and alcohols and hydrocarbons having 1 to 10 carbon atoms. Preferable examples of the chlorine-free organic solvent which is used together include methyl acetate, acetone, methyl formate, ethyl formate, methyl ethyl ketone, cyclopentanone, cyclohexanone, methyl acetylacetate, methanol, ethanol, 1-propanol, 2-propanol, 1-butanol, 2-butanol, cyclohexanol, cyclohexane, and hexane.

Preferable examples of the combination of the chlorine-containing organic solvents used as a main solvent in the present invention are described below. However, the combination is not limited to these examples.

Dichloromethane/methanol/ethanol/butanol (80/10/5/5, mass parts),

Dichloromethane/acetone/methanol/propanol (80/10/5/5, mass parts),

Dichloromethane/methanol/butanol/cyclohexane (80/10/5/5, mass parts),

Dichloromethane/methyl ethyl ketone/methanol/butanol (80/10/5/5, mass parts),

Dichloromethane/acetone/methyl ethyl ketone/ethanol/isopropanol(75/10/10/5/7, mass parts), Dichloromethane/cyclopentanone/methanol/isopropanol (80/10/5/8, mass parts), Dichloromethane/methyl acetate/butanol (80/10/10, mass parts), Dichloromethane/cyclohexanone/methanol/hexane (70/20/5/5, mass parts), Dichloromethane/methyl ethyl ketone/acetone/methanol/ethanol (50/20/20/5/5, mass parts), Dichloromethane/1,3-dioxolan/methanol/ethanol (70/20/5/5, mass parts), Dichloromethane/dioxane/acetone/methanol/ethanol (60/20/10/5/5, mass parts), Dichloromethane/acetone/cyclopentanone/ethanol/isobutanol/cyclohexane (65/10/10/5/5/5, mass parts), Dichloromethane/methyl ethyl ketone/acetone/methanol/ethanol (70/10/10/5/5, mass parts), Dichloromethane/acetone/ethyl acetate/ethanol/butanol/hexane (65/10/10/5/5/5, mass parts), Dichloromethane/acetomethyl acetate/methanol/ethanol (65/20/10/5, mass parts), Dichloromethane/cyclopentanone/ethanol/butanol (65/20/10/5, mass parts), (Dissolution)

Whether the solvent of the dope of the present invention contains chlorine or no chlorine, cellulose acylate is dissolved in this solvent preferably at a ratio of 10 to 30% by mass, more preferably at a ratio of 13 to 27% by mass, even more preferably at a ratio of 15 to 25% by mass.

Before the cellulose acylate is dissolved, the cellulose acylate is preferably swelled with the solvent to be used. In this connection, it is preferable to swell by use of the above-described method. The temperature at this time is preferably from 0 to 40° C., and the time is preferably from 0.1 hour or more, but 100 hours or less; more preferably from 0.1 hour or more, but 50 hours or less; further preferably from 0.2 hour or more, but 50 hours or less; and particularly preferably from 0.5 hour or more, but 30 hours or less.

Thereafter, the cellulose acylate is cooled and heated so as to be dissolved, as described above. During the cooling, the cellulose acylate may be allowed to stand still, or kneaded and stirred. Preferably, the cellulose acylate is kneaded and stirred. At this time, the following method can be used: a method described in JP-A-11-323017, 10-67860, 10-95854, 10-324774 or 11-302388. That is, the cellulose acylate is mixed with the solvent, swelled, and dissolved in the solvent by use of a screw-shaped kneader to which a cooling jacket is fitted. Thereafter, in the first embodiment of the present invention, the solution is preferably heated step by step, as described above.

On the otherhand, in the second embodiment of the present invention, it is preferable, when dissolving using the above screw-shaped kneader, to conduct multistage coolingcool described above.

The various additives may be added to the solution before the swelling step, in the middle of the step, or after the step. Alternatively, after the swelling step, the additives may be added thereto in the middle of the step of cooling and dissolving the cellulose acylate or after this step.

Usually, the dope of the present invention is preferably subjected to concentration and filtration. These are described in detail in "Kokai Gifo of Japan Institute of Invention & Innovation" (Kogi No. 2001-1745, published on Mar. 15, 2001), p. 25.

Further, in the second embodiment of the present invention, it is preferable that each value of $\tan\delta$, G', the minimum absorbance (Am) of 550 nm at a temperature ranging from 0° C. to −40° C. and an absorbance of 550 nm at −50° C. that is obtained measuring the dope in a closed system is within the aforementioned range. These values are those obtained under the condition that a concentration of cellulose acylate is 15% by mass. Therefore, a dope is diluted or concentrated depending on the concentration of the dope to be measured so as to keep a concentration of cellulose acylate constant, i.e., 15% by mass. Further, these values are those obtained by measurement of a system containing only cellulose acylate and a solvent, before addition of additives.

(Film Formation)

The method and apparatus for producing the cellulose acylate film of the present invention may be a solution-casting film-forming method and a solution-casting film-forming apparatus that are supplied to produce conventional cellulose triacetate films. A dope prepared in a dissolving device (pot) is once stored in a storing pot. The dope is subjected to antifoaming treatment to prepare a final dope.

In the first embodiment of the present invention, from a discharging port in the pot, the dope is fed through a metering pump (for example, a pressurizing-type constant-flow-rate gear pump capable of feeding a constant flow rate of liquid with high precision by controlling the number of rotations of the gear) to a pressurizing-type die. The dope is homogeneously cast onto a metal support of an endless belt (band) from a mouthpiece (slit). Thereafter, the dope film that is half-dried, which is referred to as a "web" also, is peeled from the metal support at a peeling point which is after a substantial one circumference from the dope-casting point. The temperature of the space round the casting section is not particularly limited, and is preferably from 0 to 90° C., more preferably from 10 to 80° C., even more preferably from 20 to 70° C. The humidity thereof is preferably from 0 to 70% RH (relative humidity), more preferably from 0 to 50% RH. In the first embodiment of the present invention, it is preferred that the dope is solidified on the band with volatilization of the solvent, and then peeled as described above. Such a manner is characterized in that the time when the dope stays on the band is long and the resultant film is leveled during this time so that surface irregularities in the formed film get less.

In the second embodiment of the present invention, from a discharging port in the pot, the dope is fed through a metering pump (for example, a pressurizing-type constant-flow-rate gear pump capable of feeding a constant flow rate of liquid with high precision by controlling the number of rotations of the gear) to a pressurizing-type die. The dope is homogeneously cast onto a metal support of a cooling drum from a mouthpiece (slit). Thereafter, the dope film that is half-dried, which is referred to as a "web" also, is peeled from the metal support at a peeling point which is after a substantial one circumference from the dope-casting point. The temperature of the space round the casting section is not particularly limited, and is preferably from −100 to 10° C., more preferably from −80 to 5° C., even more preferably from −70 to 0° C. The humidity thereof is preferably from 0 to 70% RH (relative humidity), more preferably from 0 to 50% RH. In the second embodiment of the present invention, it is preferred to utilize gelaration at a low temperature, since it is possible to peel without volatilization of the organic solvent from the cellulose acylate, resulting in high-speed casting. Cooling the casting section may be carried out by introducing a cooled gas, or equipping a cooling device at the casting section to cool the space.

At third time, it is necessary to pay attention that water does not bond. This problem can be resolved by using dry gases. The atmosphere around the casting section is preferable an inert gas, such as nitrogen, argon and helium, from the view point of explosion.

In the flow casting, one kind cellulose acylate solution for a monolayer may be cast, or two or more kinds of cellulose acylate solutions may be multi-cast simultaneously or successively. In the case of carrying out casting steps for forming two or more layers, the kinds of the cellulose acylates, solvents and additives for the respective layers, and the concentrations thereof may be the same or different. In this case, it is sufficient that the dope for forming at least one of the layers is within the scope of the present invention.

While both side ends of the web is held by clips to keep the width of the web after the web is peeled, the web may be carried by means of a tenter and dried, or the web may be dried while the web is carried on a roll. These manners may be combined to dry the web. The web may be drawn before the drying, in the middle of the drying or after the drying. The draw may be MD drawing, TD drawing, or both thereof. The draw ratio of the web is preferably from 1 to 80% (inclusive), more preferably from 2 to 60% (inclusive), even more preferably from 3 to 50% (inclusive) in each of drawing directions. The drawing temperature is preferably from 50 to 180° C. (inclusive), more preferably from 70 to 150° C. (inclusive), even more preferably from 80 to 140° C. (inclusive).

The ratio of the solvent remaining in the film is preferably from 0 to 5% (inclusive), more preferably from 0 to 2% (inclusive), even more preferably from 0 to 1% (inclusive) after the drying of the film is finished. After the finish of the drying, the film is wound up while both ends (i.e., both side ends) of the film are trimmed. In the first embodiment of the present invention, the trimmed scraps are cut, and the cut scraps are used as collected wastes to produce a dope, as described above.

The width of the film after the trimming is preferably from 0.5 to 5 m (inclusive), more preferably from 0.7 to 3 m (inclusive), even more preferably from 1 to 2 m (inclusive). The length of the wound film is preferably from 300 to 30,000 m (inclusive), more preferably from 500 to 10,000 m (inclusive), even more preferably from 1,000 to 7,000 m (inclusive).

(Surface Treatment)

The cellulose acylate film may be subjected to a surface treatment, if necessary, in order to achieve strong adhesion between the cellulose acylate film and each functional layers (e.g., subbing layer and backing layer). As the above-mentioned surface treatment, various surface-activation treatments can be used, such as a glow discharge treatment, an ultraviolet ray treatment, a corona discharge treatment, a flame treatment, an acid treatment, and an alkali treatment. The glow discharge treatment referred to herein may be treatment with low-temperature plasma generated in a low-pressure gas having a pressure of $10^{-3}$ to 20 Torr. Treatment with plasma under atmospheric pressure is also preferable. Plasma excitation gas is gas which can be excited to plasma under conditions as described above, and examples thereof include argon, helium, neon, krypton, xenon, nitrogen, carbon dioxide, flons such as tetrafluoromethane, and mixtures thereof. Details thereof are in "Kokai Gifo of Japan Institute of Invention & Innovation" (Kogi No. 2001-1745, published on Mar. 15, 2001), pp. 30-32. In the plasma treatment under atmospheric pressure, to which attention has been paid in recent years, for example, a radiating energy of 20 to 500 Kgy is used under a condition of 10 to 1000 Kev. Preferably, a radiating energy of 20 to 300 Kgy is used under a condition of 30 to 500 Kev. Of these treatments, alkali saponifying treatment is particularly preferable. This treatment is very useful as the surface treatment for the cellulose acylate film.

The alkali saponifying treatment may be conducted by immersing the film into a saponifying solution, or applying a saponifying solution onto the film. In the case of the immersing method, the treatment can be attained by passing the film into a tank wherein an aqueous solution of NaOH, KOH or the like which has a pH of 10 to 14 and is heated to 20 to 80° C. is put for 0.1 to 10 minutes, neutralizing the solution on the film, washing the film, and drying the film.

Examples of the application method included dip coating, curtain coating, extrusion coating, bar coating and type E coating. As the solvent in the alkali saponifying treatment coating solution, it is preferable to employ a solvent which has an excellent wettability appropriate for applying the saponifying solution to a transparent support and can hold favorable surface conditions without forming any irregularity on the transparent support surface. More specifically speaking, it is preferable to use an alcoholic solvent and isopropyl alcohol is particularly preferable therefor. It is also possible to employ an aqueous solution of a surfactant as the solvent. As the alkali in the liquid saponifying solution, it is preferable to use an alkali soluble in the above-described solvent and KOH and NaOH are still preferable therefor. It is preferable that the liquid saponifying agent has a pH value of 10 or more, still preferably 12 or more. Concerning the reaction conditions, it is preferable to perform the saponification at room temperature for 1 second or longer but not longer than 5 minutes, still preferably for 5 seconds or longer but not longer than 5 minute and particularly preferably for 20 seconds or longer but not longer than 3 minutes. After the completion of the alkali saponification reaction, it is preferable to wash with water; or wash with acid and then wash with water, the face coated with the liquid saponifying agent. The solution-applying manner saponifying treatment, and the application of an oriented film, which will be detailed later, may be continuously conducted. In the case, the number of steps can be reduced. These saponifying methods are specifically described in, for example, JP-A-2002-82226 and WO 02/46809.

It is preferable to form an undercoat layer on the film in order to bond the film to a functional layer. This layer may be applied onto the film after the above-mentioned surface treatment is conducted, or without conducting any surface treatment. Details of the undercoat layer are described in "Kokai Gifo of Japan Institute of Invention & Innovation" (Kogi No. 2001-1745, published on Mar. 15, 2001), p. 32.

The surface treatment, and the undercoating step may be integrated, as a final stage, into the film forming process, or may be carried out independently or in the middle of the step of forming the functional layer, which will be detailed just below.

(Functional Layer)

It is preferable to combine the cellulose acylate film of the present invention with one or more out of the functional layers details of which are described in "Kokai Gifo of Japan Institute of Invention & Innovation" (Kogi No. 2001-1745, published on Mar. 15, 2001), pp. 32-45. Of these functional layers, preferable are a light-polarizing layer, which is used to form a polarizing plate, an optically compensating layer, which is used to form an optically compensating sheet, and an antireflection layer, which is used to an antireflection film.

(1) Addition of a Light Polarizing Layer (Production of a Polarizing Plate)

[Material to be Used]

At present, a commercially available light-polarizing layer may be generally formed by immersing a drawn polymer into a solution of iodine or a dichroic dye in a bath, thereby causing the iodine or dichroic dye to permeate the binder. As the light-polarizing film, a coating type light-polarizing film, typical examples of which are manufactured by Optiva Inc., can also be used. The iodine or the dichroic dye in the light-polarizing film is oriented in the binder, thereby exhibiting light-polarizing performance. Examples of dichroic dyes include azo-series dyes, stilbene-series dyes, pyrazolone-series dyes, triphenylmethane-series dyes, quinoline-series dyes, oxazine-series dyes, thiazine-series dyes and anthraquinone-series dyes. Of these dyes, water-soluble dyes are preferred. The dichroic dyes preferably contains hydrophilic substitutent, such as sulfonic acid, amino and hydroxyl groups. Examples thereof include compounds described in "Kokai Gifo of Japan Institute of Invention & Innovation" (Kogi No. 2001-1745, published on Mar. 15, 2001), p. 58.

The binders of light-polarizing film used in the invention can be polymers capable of cross-linking by themselves, polymers capable of undergoing cross-linking reaction in the presence of a cross-linking agent, or combinations thereof. Examples of these binders include styrene-series copolymers, polyolefins, polyvinyl alcohols (PVAs), modified PVAs, poly(N-methylolacrylamides), polyesters, polyimides, vinyl acetate copolymers, carboxymethyl celluloses, polycarbonates, and methacrylate-series copolymers described in paragraph [0022] of the specification in JP-A-8-338913. A silane coupling agent can be used as a polymer. Of these binders, water-soluble polymers such as poly(N-methylolacrylamides), carboxymethyl celluloses, gelatin, PVAs and modified PVAs are preferred over the others.

Further, gelatin, PVAs and modified PVAs, especially PVAs and modified PVAs, are used to advantage. It is most preferred to use two kinds of polyvinyl alcohols or modified polyvinyl alcohols having different polymerization degrees. PVAs usable in the invention have a saponification degree in the range of, preferably 70 to 100%, more preferably 80 to 100%. The suitable polymerization degree thereof is from 100 to 5,000. The modified PVAs used to particular advantage includes the compounds disclosed in JP-A-8-338913, JP-A-9-152509 and JP-A-9-316127. Two or more kinds of polyvinyl alcohols or modified polyvinyl alcohols may be used together.

The lower limit of the thickness of the binder is preferably 10 μm. The upper limit of the thickness is preferably as thin as possible from the viewpoint of light leakage from the liquid crystal display device. The thickness is preferably thinner than the thickness (about 30 μm) of polarizing plates commercially available at the present, and is more preferably 25 μm or less, further preferably 20 μm or less.

The binder in the light-polarizing film may be crosslinked. A polymer or monomer having a crosslinkable functional group may be incorporated into the binder, or a crosslinkable functional group may be given to the binder polymer itself. The crosslinking may be attained by light, heat, or pH change, so as to make it possible to cause the binder to have a crosslinked structure. Crosslinking agents are described in U.S. Patent Re-issue No. 23297. A boron compounds (such as boric acid or borax) also may be used as a crosslinking agent. The amount of the crosslinking agent added to the binder is preferably from 0.1 to 20% by mass of the binder. In this case, the orientation of the polarizer and the wet heat resistance of the light-polarizing film become good.

After the end of the crosslinking reaction, the amount of the crosslinking agent which has not reacted is preferably 1.0% by mass or less, more preferably 0.5% by mass or less. This way makes it possible to improve the weather resistance of the film.

[Drawing]

It is preferable that the light-polarizing film is drawn (drawing process) or is rubbed (rubbing process), and subsequently the film is dyed with iodine or a dichroic dye.

In the case of the drawing process, the draw ratio of the film is preferably from 2.5 to 30.0, more preferably from 3.0 to 10.0. The drawing can be carried out by dry drawing in the air or wet drawing in the state that the film is immersed in water. The draw ratio in the dry drawing is preferably from 2.5 to 5.0, and the draw ratio in the wet drawing is preferably from 3.0 to 10.0. The drawing may be performed in parallel to the direction along which the film is carried (parallel drawing), perpendicularly to the film-carried direction (lateral one-axial drawing), or obliquely (oblique drawing). This drawing may be attained by one drawing operation or plural drawing operations. The drawing based on the plural drawing operations makes it possible to draw the film homogeneously even when a high-ratio drawing is performed.

More preferable is oblique drawing wherein the film is drawn at an angle of 10 to 80 degrees oblique to the film-carried direction.

(A) Parallel Drawing Process

Before the film is drawn, the PVA film is swelled. The swelling degree thereof (the ratio by weight of the film before the swelling to the film after the swelling) is from 1.2 to 2.0. Thereafter, while the film is continuously carried through guide rollers and so on, the film is drawn in an aqueous medium bath or a dyeing bath wherein a dichroic material is dissolved at a bath temperature of preferably 15° C. to 50° C., more preferably 17° C. to 40° C. The drawing can be attained by grasping the film by means of two pairs of nip rollers, the carrying rate of the backward nip rollers being made larger than that of the forward nip rollers. A tenter may be used to draw the film in a lateral direction. In either case, the draw ratio, which is the ratio of the length of the drawn film to that of the film at the initial stage (this being the same hereinafter), is preferably from 1.2 to 3.5, more preferably from 1.5 to 3.0 from the viewpoint of the above-mentioned effects and advantages. Thereafter, the film is dried at 50 to 90° C. to yield a light-polarizing film.

(B) Oblique Drawing Process

As this process, a method described in JP-A-2002-86554 can be used wherein a tenter projected in an oblique direction is used to perform drawing. Since this drawing is performed in the air, it is necessary to hydrate the film beforehand so as to be made easy to draw. The water content in the film is preferably from 5 to 100% (inclusive), more preferably from 10 to 100% (inclusive).

The temperature when the film is drawn is preferably from 40° C. to 90° C. (inclusive), more preferably from 50° C. to 80° C. (inclusive). The humidity is preferably from 50 to 100% RH (inclusive), more preferably from 70 to 100% RH (inclusive), further preferably from 80 to 100% RH (inclusive). The advance speed in the longitudinal direction is preferably 1 m/minute or more, more preferably 3 m/minute or more.

After the end of the drawing, the film is dried preferably at 50° C. to 100° C. (inclusive), more preferably at 60° C. to 90° C. (inclusive), preferably for 0.5 to 10 minutes (inclusive), more preferably for 1 to 5 minutes (inclusive).

The angle of the absorption axis of the thus-obtained light-polarizing film is preferably from 10 to 80 degrees, more preferably from 30 to 60 degrees, further preferably substantially 45 degrees (from 40 to 50 degrees).

[Adhesion]

The saponified cellulose acylate film and the light-polarizing layer prepared by the drawing are adhered to each other to prepare a polarizing plate. About the direction along which they are adhered to each other, the angle between the direction of the flow casting axis of the cellulose acylate film and the draw axis of the polarizing plate is preferably set to 45 degrees.

The adhesive agent for the adhesion is not particularly limited. Examples thereof include PVA-series resins (which may be modified with an acetoacetyl, sulfonic acid, carboxyl, oxyalkylene or some other group); and an aqueous solution of a boron compound. The PVA-series resins are particularly preferable. The thickness of the adhesive agent layer is preferably from 0.01 to 10 μm, more preferably from 0.05 to 5 μm after the layer is dried.

It is more preferable that the light transmittance of the thus-obtained polarizing plate is higher and the polarization degree thereof is higher. The light transmittance of the polarizing plate to light having a wavelength of 550 nm is preferably from 30 to 50%, more preferably from 35 to 50%, most preferably from 40 to 50%. The polarization degree thereof to light having a wavelength of 550 nm is preferably from 90 to 100%, more preferably from 95 to 100%, most preferably from 99 to 100%.

The thus-obtained polarizing plate is laminated on a λ/4 plate, whereby a circular polarization plate can be produced. In this case, the laminating is carried out to set the angle between the retarded phase axis of the λ/4 plate and the absorption axis of the polarizing plate to 45 degrees. At this time, the λ/4 plate is not particularly limited, and is preferably a λ/4 plate having a wavelength dependency such that the retardation thereof is smaller to a lower wavelength. It is also preferable to use a λ/4 plate composed of a light-polarizing film having an absorption axis inclined at an angle of 20 to 70 degrees to the longitudinal direction and an optically anisotropic layer made of a liquid crystal compound.

Addition of an Optically Compensating Layer (Production of an Optically Compensating Sheet)

The optically compensating sheet is a sheet for making compensation for a liquid crystal compound in a liquid crystal cell in a liquid crystal display device at the time of black display, and is added by forming an oriented film on the cellulose acylate film and further forming an optically anisotropic layer thereon.

[Oriented Film]

An oriented film is formed on the above-mentioned surface-treated cellulose acylate film. This film has a function of deciding the orientation direction of liquid crystal molecules. However, if a liquid crystal compound is oriented and subsequently the orientation state is fixed, the oriented film is not necessarily essential as a constituent of the present invention since the oriented film has fulfilled the function thereof. In other words, only the optically anisotropic layer which is in a fixed orientation state and is formed on the oriented film is transferred onto a polarizer, whereby the polarizing plate of the present invention can be produced.

The orientation film can be provided by rubbing an organic compound (preferably a polymer), oblique evaporation of an inorganic compound, forming a layer having a micro group, or accumulation of an organic compound (for example, ω-tricosanoic acid, dioctadecylmethylammonium chloride or methyl stearate) by the Langmuir-Blodgett method (LB film). Furthermore, there have been known orientation films having an orienting function imparted thereto by applying an electrical field, applying a magnetic field or irradiating with light.

It is preferable to form the oriented film by subjecting a polymer to rubbing treatment. In principle, the polymer used in the oriented film has a molecular structure having a function of orienting liquid crystal molecules.

In the present invention, it is preferable to not only cause the polymer used in the oriented film to have the above-mentioned function of orienting liquid crystal molecules, but also introduce, into the main chain of the polymer, a side chain having a crosslinkable functional group (for example, a double bond), or it is preferable to introduce, into a side chain of the polymer, a crosslinkable functional group having a function of orienting liquid crystal molecules.

The polymers used in the invention can be polymers capable of cross-linking by themselves, polymers capable of undergoing cross-linking reaction in the presence of a cross-linking agent, or combinations thereof. Examples of polymers usable in the invention include styrene-series copolymers polyolefins, polyvinyl alcohols (PVAs), modified PVAs, poly(N-methylolacrylamides), polyesters, polyimides, vinyl acetate copolymers, carboxymethyl celluloses, polycarbonates, methacrylate-series copolymers described in paragraph [0022] of the specification in JP-A-8-338913, and compounds such as a silane coupling agent. Of these polymers, water-soluble polymers such as poly(N-methylolacrylamides), carboxymethyl celluloses, gelatin, PVAs and modified PVAs are preferred over the others. Further, gelatin, PVAs and modified PVAs, especially PVAs and modified PVAS, are used to advantage. It is most preferred to use two kinds of polyvinyl alcohols or modified polyvinyl alcohols having different polymerization degrees. PVAs usable in the invention have a saponification degree in the range of, preferably 70 to 100%, more preferably 80 to 100%. The suitable polymerization degree thereof is from 100 to 5,000.

The side chain having a function of orienting liquid crystal molecules in general has a hydrophobic group as a functional group. The specific kind of the functional group is decided dependently on the kind of the liquid crystal molecules and a required orientation state. Modifying groups of the modified polyvinyl alcohol can be introduced by copolymerization, by chain transfer and by block polymerization. Examples of the modifying group include a hydrophilic group (e.g., carboxylic group, sulfonic group, phosphonic group, amino group, ammonium group, amido group, thiol group), a hydrocarbon group having 10 to 100 carbon atoms, a fluorine-substituted hydrocarbon group, a thioether group, a polymerizable group (unsaturated polymerizable group, epoxy group, aziridinyl group), and an alkoxysilyl group (trialkoxysilyl, dialkoxysilyl, monoalkoxysilyl). The modified polyvinyl alcohols are described in JP-A-2000-155216, paragraphs [0022] to [0145], and JP-A-2002-62426, paragraphs [0018] to [0022].

When a side chain having a crosslinkable functional group is bonded to the main chain of the oriented film polymer or a crosslinkable functional group is introduced into a side chain thereof having a function of orienting liquid crystal molecules, the oriented film polymer can be copolymerized with a polyfunctional monomer contained in the optically anisotropic layer. As a result, strong bonding based on covalent bonds is attained between the polyfunctional monomer molecules, between the oriented film polymer molecules, and between the polyfunctional monomer molecule and the oriented film polymer molecule. Consequently, the introduction of the crosslinkable functional group into the oriented film polymer makes it possible to improve the strength of the optically compensating sheet remarkably.

The crosslinkable functional group of the oriented film polymer preferably contains a polymerizable group in the same manner as the polyfunctional monomer. Specific examples thereof are described in JP-A-2000-155216, paragraphs [0080] to [0100]. The oriented film polymer can be crosslinked with a crosslinking agent, separately from the above-mentioned crosslinkable functional group.

Examples of the crosslinking agent for the polymer include aldehydes, N-methylol compounds, dioxane derivatives, compounds that works when the carboxylic group is activated, active vinyl compounds, active halogen compounds, isooxazoles and dialdehyde starch. Two or more crosslinking agents may be used in combination. Compounds described in JP-A-2002-62426, paragraphs [0023] to [0024] can be used. Reactive aldehydes are preferred, and glutaraldehyde is particularly preferred.

The amount of the crosslinking agent is in the range of preferably 0.1 to 20% by mass, more preferably 0.5 to 15% by mass based on the amount of the polymer. The amount of non-reacted crosslinking agent remaining in the orientation layer is preferably 1.0% by mass or less, more preferably 0.5% by mass or less based on the amount of the orientation layer. The adjustment as described above makes it possible to give a sufficient endurance to the oriented film without generating any reticulation even if the oriented film is used in a liquid crystal display device for a long time or is allowed to stand still in high-temperature and high-humidity atmosphere for a long time.

The oriented film for use in the present invention can be basically formed by coating a solution containing the polymer (the oriented film forming material) and the cross-linking agent as recited above on a transparent substrate, drying by heating (to cause cross-linking reaction) and rubbing the coating surface. The cross-linking reaction, as mentioned above, may be carried out in an arbitrary stage after coating the solution on the transparent substrate. In the case of using a water-soluble polymer, such as PVA, as the oriented film forming material, a mixture of water with an organic solvent having a defoaming action, such as methanol, is preferably employed as the solvent of the coating solution. The suitable ratio of water to methanol is preferably from 0:100 to 99:1, more preferably from 0:100 to 91:9, by mass. By the use of such a mixed solvent, the generation of foams can be prevented to ensure markedly decreased defects in the oriented film, especially the surface of the optically anisotropic layer.

Examples of a coating method for the oriented film which can be adopted include a spin coating method, a dip coating method, a curtain coating method, an extrusion coating method, a rod coating method and a roll coating method. Of these methods, the rod coating method is preferred over the others. The suitable thickness of the polymer layer after drying is from 0.1 to 10 μm. The drying by heating can be performed at a temperature of 20° C. to 110° C. In order to form cross-links to a satisfactory extent, the drying temperature is preferably from 60° C. to 100° C., particularly preferably from 80° C. to 100° C. The drying time is generally from 1 minute to 36 hours, preferably from 1 to 30 minutes. Further, it is favorable to adjust the pH to an optimum value for the cross-linking agent used. In the case of using glutaraldehyde as a cross-linking agent, the suitable pH is from 4.5 to 5.5, especially 5.

The orientation layer is provided on the transparent support or an undercoating layer. After the above-described polymer layer is crosslinked, the surface of the layer is subjected to rubbing treatment to form the orientation layer.

For the rubbing treatment can be adopted the treatment methods widely used for orientating liquid crystals of LCD. More specifically, the method of rubbing the surface of an orientation film in a fixed direction by means of paper, gauze, felt, rubber, or nylon or polyester fiber can be employed for orientation. In general the orientation can be carried out by rubbing several times the polymer surface with cloth into which fibers having the same length and the same diameter are transplanted evenly.

When the rubbing treatment method carries out industrially, it can be achieved by contacting a rotating rubbing roll with a transported film having a polarizing layer. The circularity, cylindricality and deflection of the roll itself are preferably all 30 μm or below. The suitable wrap angle of a film with a rubbing roll is from 0.1 degree to 90 degrees. However, as disclosed in JP-A-8-160430, there is a case that the steady rubbing treatment is effected by winding a film around the roll at an angle of 360 degrees or more. In the case of rubbing a long film, it is desirable that the film be conveyed at a speed of 1 to 100 meters a minute. Further, it is appropriate to choose the rubbing angle from the range of 0 to 60 degrees. In the case of using the rubbed long film for LCD's, it is preferable to set the rubbing angle from 40 to 50 degrees. In particular, it is advantageous to adjust the rubbing angle to 45 degrees.

The film thickness of the thus-obtained oriented film is preferably from 0.1 to 10 μm.

Next, liquid crystal molecules of an optically anisotropic layer are oriented onto the oriented film. Thereafter, the oriented film polymer is caused to react with the polyfunctional monomer contained in the optically anisotropic layer, or a crosslinking agent is used to crosslink the oriented film polymer, if necessary.

The liquid crystal molecules used in the optically anisotropic layer may be rod-like liquid crystal molecules or disk-like liquid crystal molecules. The rod-like liquid crystal molecule and the disk-like liquid crystal molecule may each be a high molecular weight liquid crystal or a low molecular weight liquid crystal. Furthermore, a compound about which a low molecular weight liquid crystal is crosslinked to exhibit no liquid crystallinity may be used.

[Rod-Like Liquid Crystal Compound]

Specific examples of the rod-like liquid crystal compounds include azomethines, azoxy compounds, cyanobiphenyls, cyanophenylesters, benzoic acid esters, cyclohexane carboxylic acid phenylesters, cyanophenylcyclohexane compounds, cyano-substituted phenylpyrimidines, alkoxy-substituted phenylpyrimidines, phenyldioxanes, tolan compounds, alkenylcyclohexylbenzonitrils, and the like.

The rod-like liquid crystal molecule may be a metal complex. A liquid crystal polymer containing, as recurring units thereof, rod-like liquid crystal molecules can also be used as the rod-like liquid crystal molecule. In other words, the rod-like liquid crystal molecule may be bonded to a (liquid crystal) polymer.

Rod-like liquid crystal molecules are described in Quarterly Chemical Review, Vol. 22, "Chemistry of Liquid Crystal" edited by the Chemical Society of Japan (1994), Chapters 4, 7, and 11, and "Liquid Crystal Device Handbook" edited by Japan Society for the Promotion of Science, 142nd Committee, chapter 3.

The birefringence of the rod-like liquid crystal molecules is preferably from 0.001 to 0.7.

The rod-like liquid crystal molecule preferably has a polymerizable group in order to fix the orientation state thereof. The polymerizable group is preferably a radical polymerizable unsaturated group or a cation polymerizable group. Specific examples thereof include polymerizable groups and polymerizable liquid crystal compounds described in JP-A-2002-62427, paragraphs [0064] to [0086].

[Disk-Like Liquid Crystal Molecule]

Illustrative of the disk-like (discotic) liquid crystal molecule for the present invention can include benzene derivatives disclosed in a study report of C. Destrade et al., Mol. Cryst., vol. 71, page 111 (1981); truxene derivatives disclosed in a study report of C. Destrade et al., Mol. Cryst., vol. 122, page 141 (1985), and Phyics. Lett., A, vol. 78, page 82 (1990); cyclohexane derivatives disclosed in a study report of B. Kohne et al., Angew. Chem. Soc., vol. 96, page 70 (1984); macrocycles of azacrown series and phenylacetylene series disclosed in a study report of J. M. Lehn et al., J. Chem. Commun. page 1794 (1985), a study report of and J. Zhang et al., and J. Am. Chem. Soc. vol. 116, page 2655 (1994).

The above disk-like liquid crystal molecule generally has a structure in which the discotic structure unit is located at the center as a parent core and further straight chain groups such as alkyl, alkoxy and substituted benzoyloxy are radially substituted. The molecule or a cluster of the molecules is preferably the compound which has rotational symmetry and can give a given orientation. About the optically anisotropic layer made from the disk-like liquid crystal molecules, it is unnecessary that the compound which is finally contained in the optically anisotropic layer is made of a disk-like liquid crystal molecule. A low molecular weight disk-like liquid crystal molecule having a thermo- or photo-reactive group is polymerized or crosslinked by heat or light to form a polymer that does not behave as liquid crystal. Such polymer can be also used in the invention. Preferred examples of the disk-like liquid crystal molecule are described in JP-A-8-50206. JP-A-8-27284 discloses polymerization of a disk-like liquid crystal molecule.

In order to fix the disk-like liquid crystal molecule by polymerization, it is necessary to bond a polymerizable group as a substitutent to the disk-like core of the disk-like liquid crystal molecule. A compound wherein the disk-like core and the polymerizable group are bonded through a linking group is preferred. By this structure, the orientation state of the compound can be kept in the polymerization reaction. Examples of the compound include compounds described in JP-A-2000-155216, paragraphs [0151] to [0168].

In hybride orientation, an angle between major axis (disc plane) of disk-like liquid crystal molecule and plane of light polarizing film increases or decreases with increase of distance from plane of light polarizing film and in the direction of depth from the bottom of the optically anisotropic layer. The angle preferably decreases with increase of the distance. Further, examples of variation of the angle include continuous increase, continuous decrease, intermittent increase, intermittent decrease, variation containing continuous increase and decrease, and intermittent variation containing increase or decrease. The intermittent variation contains an area where the inclined angle does not vary in the course of the thickness direction of the layer. The angle preferably totally increases or decreases in the layer, even if it does not vary in the course. The angle more preferably increases totally, and it is particularly preferred to increase continuously.

Average direction of major axis of disk-like liquid crystal molecule on the light polarizing film side can be generally controlled by selecting the disk-like liquid crystal molecule or materials of the orientation layer, or by selecting methods for the rubbing treatment. The direction of major axis (disc plane) of disk-like liquid crystal molecule on the surface side (air side) can be generally controlled by selecting the disk-like liquid crystal molecule or other compounds used together with the disk-like liquid crystal molecule. Examples of the other compound include plasticizer, surface active agent, polymerizable monomer and polymer. Further, the extent of variation of the inclined angle can be also controlled by the above selection.

[Other Components of the Optically Anisotropic Layer]

The use of a plasticizer, a surfactant, a polymerizable monomer and others together with the liquid crystal molecules makes it possible to improve the uniformity of the coating film to be obtained, the strength of the film, the orientation of the liquid crystal molecules, and others. It is preferable that these components are compatible with the liquid crystal molecules and can change the tilt angle of the liquid crystal molecules or do not hinder the orientation.

The polymerizable monomer may be a radical polymerizable compound or a cation polymerizable compound, and is preferably a polyfunctional radical polymerizable monomer. Preferably, the polymerizable monomer is a monomer copolymerizable with the above-mentioned liquid crystal compound having the polymerizable group. Examples thereof include monomers described in JP-A-2002-296423, paragraphs [0018] to [0020]. The added amount of the compound is preferably from 1 to 50%, more preferably from 5 to 30% by mass of the disk-like liquid crystal molecules.

The surfactant may be a compound known in the prior art. A fluorine-containing compound is particularly preferable. Specific examples thereof include compounds described in JP-A-2001-330725, paragraphs [0028] to [0056].

It is preferable that the polymer used together with the disk-like liquid crystal molecules can change the tilt angle of the disk-like liquid crystal molecules.

An example of the polymer is cellulose ester. Preferable examples of the cellulose ester are described in JP-A-2000-155216, paragraph [0178]. In order not to hinder the orientation of the liquid crystal molecules, the added amount of the polymer is preferably from 0.1 to 10%, more preferably from 0.1 to 8% by mass of the liquid crystal molecules.

The transition temperature from discotic nematic phase to solid phase (temperature for heating) is preferably in the range of 70 to 300° C., especially 70 to 170° C.

[Formation of Optically Anisotropic Layer]

The optically anisotropic layer can be formed by applying a coating solution, which contains the liquid crystal molecule together with the following polymerization initiator and other additives, onto the orientation film.

As the solvent to be used in preparing the coating solution, it is preferable to use an organic solvent. Examples of the organic solvent include amides (for example, N,N-dimethylformamide), sulfoxides (for example, dimethyl sulfoxide), heterocyclic compounds (for example, pyridine), hydrocarbons (for example, benzene and hexane), alkyl halides (for example, chloroform, dichloromethane and tetrachloroethane), esters (for example, methyl acetate and butyl acetate), ketones (for example, acetone and methyl ethyl ketone) and ethers (for example, tetrahydrofuran and 1,2-dimethoxyethane). Alkyl halides and ketones are preferred. It is also possible to use two or more organic solvents together.

The coating solution can be applied by a publicly known method (for example, the wire bar coating method, the extrusion coating method, the direct gravure coating method, the reverse gravure coating method or the die coating method).

The film thickness of the optically anisotropic layer is preferably from 0.1 to 20 μm, more preferably from 0.5 to 15 μm, and most preferably from 1 to 10 μm.

[Holding the Oriented State of a Liquid Crystal Molecule]

The thus oriented liquid crystal molecule can be fixed while holding the oriented state. The fixation is preferably carried out by the polymerization reaction. The polymerization reaction includes a heat polymerization reaction with the use of a heat polymerization initiator and a photopolymerization reaction with the use of a photopolymerization initiator. The photopolymerization reaction is preferred.

Examples of the photopolymerization initiator include α-carbonyl compounds (described in U.S. Pat. Nos. 2,367,661 and 2,367,670), acyloin ether (described in U.S. Pat. No. 2,448,828), α-hydrocarbon-substituted acyloin compounds (described in U.S. Pat. No. 2,722,512), polynuclear quinone compounds (described in U.S. Pat. Nos. 3,046,127 and 2,951,758), combinations of a triarylimidazole dimer with p-aminophenyl ketone (described in U.S. Pat. No. 3,549, 367), acridine and phenazine compounds (described in JP-A-60-105667 and U.S. Pat. No. 4,239,850) and oxadiazol compounds (described in U.S. Pat. No. 4,212,970).

It is preferable to use the photopolymerization initiator in an amount of from 0.01 to 20% by mass, more preferably from 0.5 to 5% by mass, based on the solid matters in the coating solution.

In the photoirradiation for polymerizing the liquid crystal molecule, it is preferable to use UV light.

The irradiation energy preferably ranges from 20 mJ/cm$^2$ to 50 J/cm$^{-2}$, more preferably from 20 to 5,000 mJ/cm$^{-2}$, further preferably from 100 to 800 mJ/cm$^{-2}$. To accelerate the photopolymerization reaction, the photoirradiation may be carried out under heating.

A protective layer may be formed on the optically anisotropic layer.

It is also preferable to combine this optically compensating film with a light-polarizing layer. Specifically, a coating solution for forming optically anisotropic layers, as described above, is applied onto the surface of a light-polarizing film, thereby forming an optically anisotropic layer. As a result, produced is a thin polarizing plate giving only a small stress (strain×sectional area×elastic modulus) with a change in the size of the light-polarizing film without using any polymer film between the light-polarizing film and the optically anisotropic layer. By fitting a polarizing plate according to the present invention into a large-sized liquid crystal display device, images having a high display quality can be displayed without causing problems, such as light leakage.

The tilt angle between the light-polarizing layer and the optically compensating layer is preferably adjusted by drawing the layers in such a manner that the angle is matched with the angle between the transmission axis of two polarizing plates adhered onto both surfaces of a liquid crystal cell which constitutes a LCD and the lengthwise or lateral direction of the liquid crystal cell. Such an angle is generally 45 degrees, but it is not always 45 degrees in some of the latest transmission, reflection or semi-transmission type LCD modes. Therefore, it is desirable that the drawing direction be adjustable in order to conform to the design of LCD.

[Liquid Crystal Display Device]

Each of liquid crystal modes wherein such an optically compensating film is used is described hereinafter.

(TN Mode Liquid Crystal Display Device)

The liquid crystal cell of TN mode is widely used in color TFT liquid crystal displays, and hence is described in many publications. In a liquid crystal cell in the TN mode, the orientation state of the liquid crystal therein at the time of black display is the state that rod-like liquid crystal molecules in the central portion of the cell stand up and the molecules lie down in portions near substrates of the cells.

(OCB mode Liquid Crystal Display Device)

The liquid crystal cell of OCB mode is a liquid crystal cell of bend orientation mode in which rod-like liquid crystal molecules in upper part and ones in lower part are essentially reversely (symmetrically) oriented. A liquid crystal display device having the liquid crystal cell of bend orientation mode is disclosed in U.S. Pat. Nos. 4,583,825 and 5,410,422. Since rod-like liquid crystal molecules in upper part and ones in lower part are symmetrically oriented, the liquid crystal cell of bend orientation mode has self-optical compensatory function. Therefore, this mode is referred to as OCB (optically compensatory bend) mode.

In the same manner as in the TN mode, in a liquid crystal cell in the OCB mode, the orientation state of the liquid crystal in the cell at the time of black display is the state that rod-like liquid crystal molecules in the central portion of the cell stand up and the molecules lie down in portions near substrates of the cells.

(VA Mode Liquid Crystal Display Device)

The VA mode Liquid crystal display device is characterized by aligning rod-like liquid crystal molecules in essentially vertically direction. The liquid crystal cell of VA mode include some types:

(1) a liquid crystal cell of VA mode in a narrow sense (described in JP-A-2-176625), in which rod-like liquid crystal molecules are essentially vertically aligned while voltage is not applied, and the molecules are essentially horizontally aligned while voltage is applied;

(2) a liquid crystal cell of MVA mode (described in SID97, Digest of tech. Papers, 28(1997), 845), in which the VA mode is modified to be multi-domain type so as to enlarge the viewing angle;

(3) a liquid crystal cell of n-ASM mode (described in Nippon Ekisho Toronkai [Liquid crystal forum of Japan], Digest of tech. Papers (1998), 58-59), in which rod-like liquid crystal molecules are essentially vertically aligned while voltage is not applied, and the molecules are essentially oriented in twisted multi-domain alignment while voltage is applied; and (4) a liquid crystal cell of SURVIVAL mode (published in LCD international 98).

(Other Liquid Crystal Display Devices)

For liquid crystal display devices in ECB and STN modes, optical compensation can be attained on the basis of the same approach as described above.

Addition of an Antireflection Layer (Antireflection Film)

An antireflection is generally formed by laying a low refractive index layer, which functions as an antifouling property layer also, and at least one layer having a higher refractive index than the low refractive index layer (i.e., a high refractive index layer and/or a middle refractive index layer) on a transparent substrate.

Examples of the method for forming a multilayered film wherein transparent thin films made of inorganic compounds (such as metal oxides) having different refractive indexes are laminated include a chemical vapor deposition (CVD) method; a physical vapor deposition (PVD) method; and a method of forming a metal compound such as metal alkoxide into a film made of colloidal metal oxide particles by a sol-gel method, and subjecting the film to post-treatment (such as ultraviolet radiation described in JP-A-9-157855, or plasma treatment described in JP-A-2002-327310).

As antireflection films having a high productivity, suggested are various antireflection films obtained by laminating thin films, each of which is made of inorganic particles dispersed in a matrix, by coating.

The antireflection film used in the present invention may be an antireflection film produced by making fine irregularities in the topmost surface of the antireflection film formed by coating as described above to give anti-glare property to the surface.

Any one of the above-mentioned manners can be applied to the cellulose acylate film of the present invention. The coating manner (coating type) is preferable.

[Layer Structure of the Coating Type Antireflection Film]

An antireflection film having a layer structure obtained by forming, on a substrate, at least a middle refractive index layer, a high refractive index layer, and a low refractive index layer (the outermost layer) in this order is designed to have refractive indexes satisfying the following relationship:

the refractive index of the high refractive index layer>the refractive index of the middle refractive index layer>the refractive index of the transparent substrate>the refractive index of the low refractive index layer.

A hard coat layer may be formed between the transparent substrate and the middle refractive index layer. The antireflection film may be composed of a middle refractive index hard coat layer, a high refractive index layer and a low refractive index layer.

Examples thereof are described in JP-A-8-122504, JP-A-8-110401, JP-A-10-300902, JP-A-2002-243906, and JP-A-2000-111706. A different function may be given to each of the layers. Examples thereof include a low refractive index layer having antifouling property, and a high refractive index layer having antistatic property (described in JP-A-10-206603, JP-A-2002-243906, and the like).

A haze of the antireflection film is preferably 5% or less, more preferably 3% or less. A mechanical strength of the film is preferably H or more, further preferably 2H or more, and most preferably 3H or more in term of the pensile hardness, according to JIS K5400 test.

[High-Refractive-Index Layer and Middle-Refractive-Index Layer]

The high refractive index layer of the antireflection film is a curable film containing at least inorganic compound superfine particles having a high refractive index and an average particle size of 100 nm or less, and matrix binder.

The high refractive index, inorganic compound superfine particles may be made of an inorganic compound having a refractive index of 1.65 or more, and are preferably made of an inorganic compound having a refractive index of 1.9 or more. Examples of the inorganic compound include oxides of Ti, Zn, Sb, Sn, Zr, Ce, Ta, La, In and others; and complex oxides containing two or more out of these metal atoms.

Examples of the production of such superfine particles include treatment of particles surfaces with a surface-treating agent (such as a silane coupling agent described in JP-A-11-295503, JP-A-11-153703, and JP-A-2000-9908, or an anionic compound or an organic metal coupling agent described in JP-A-2001-310432 and the like), the formation of a core-shell structure wherein high refractive index particles are made up to a core (described in JP-A-2001-166 and the like), and use of fine particles together with a specific dispersing agent (described in JP-A-11-153703 and JP-A-2002-2776069, U.S. Pat. No. 6,210,858B and the like).

The material which forms the matrix may be a thermoplastic resin or thermosetting resin known in the prior art.

The material is preferably at least one composition selected from a composition comprising a polyfunctional compound containing at least two radical polymerizable groups and/or cation polymerizable groups, a composition comprising an organic metal compound containing a hydrolyzable group, and a composition comprising a partial condensate thereof. Examples of the compound include compounds described in JP-A-2000-47004, JP-A-2001-315242, JP-A-2001-31871, and JP-A-2001-296401.

Preferable is also a curable film obtained from a colloidal metal oxide obtained from a hydrolyzed condensate of a metal alkoxide, and a metal alkoxide composition. Examples thereof are described in JP-A-2001-293818.

The refractive index of the high-refractive-index layer is preferably in the range of 1.70 to 2.20. The thickness of the high-refractive-index layer is preferably from 5 nm to 10 μm, more preferably from 10 nm to 1 μm.

The refractive index of the middle-refractive-index layer is adjusted so as to become a value (magnitude) between the refractive index of the low-refractive-index layer and the refractive index of the high-refractive-index layer. The refractive index of the middle-refractive-index layer is preferably in the range of 1.50 to 1.70.

[Low-Refractive-Index Layer]

The low-refractive-index layer is laminated on the high refractive index layer. The low-refractive-index layer has a refractive index preferably in the range of 1.20 to 1.55, more preferably in the range of 1.30 to 1.50.

This layer is preferably formed as an outermost layer having scratch resistance and antifouling property. In order to improve the scratch resistance largely, it is effective to give lubricity to the surface. For this, it is possible to use the method of the thin film layer by the introduction of a conventionally-known silicone, or the introduction of fluorine.

The refractive index of the fluorine-containing compound for use in the overcoat layer is preferably 1.35 to 1.50, more preferably 1.36 to 1.47. The fluorine-containing compound used in the over coat layer preferably contains 35 to 80% by mass of fluorine atoms.

For example, the following compounds are used: compounds described in JP-A-9-222503, paragraphs [0018] to [0026], JP-A-11-38202, paragraphs [0019] to [0030], JP-A-2001-40284, paragraphs [0027] to [0028], and JP-A-2000-284102.

The silicone compound is preferably a compound which has a polysiloxane structure and contains, in the polymer chain thereof, a curable functional group or polymerizable functional group so as to have a crosslinked structure in the film to be formed. Examples thereof include reactive silicones (such as "Silaplane" (trade name), manufactured by Chisso Corporation, and polysiloxane containing at both ends thereof silanol groups (described in JP-A-11-258403 and the like).

It is preferable to conduct the crosslinking or polymerizing reaction of the fluorine-containing polymer and/or the siloxane polymer having a crosslinkable or polymerizable group by radiation of light or heating at the same time of applying a coating solution for forming an outermost layer containing a polymerization initiator, a sensitizer and others, or after the applying.

Preferable is also a sol-gel cured film obtained by curing an organic metal compound, such as a silane coupling agent, and a silane coupling agent which contains a specific fluorine-containing hydrocarbon group in the presence of a catalyst by condensation reaction.

Examples thereof include silane compounds which contain a polyfluoroalkyl group, or partially-hydrolyzed condensates (such as compounds described in JP-A-58-142958, JP-A-58-147483, JP-A-58-147484, JP-A-9-157582 and JP-A-11-106704), and silyl compounds which contains a poly(perfluoroalkyl ether group), which is a long chain group containing fluorine (such as compounds described in JP-A-2000-117902, JP-A-2001-48590, and JP-A-2002-53804).

The low refractive index layer can contain, as additives besides the above-mentioned components, a filler (such as silicon dioxide (silica); low refractive index inorganic compound particles having a primary average particle size of 1 to 150 nm (such as fluorine-containing particles (made of magnesium fluoride, calcium fluoride, barium fluoride or the like)); organic fine particles described in JP-A-11-3820, paragraphs [0020] to [0038]); a silane coupling agent; a lubricant; a surfactant; and so on.

In the case that the low refractive index layer is positioned beneath the outermost layer, the low refractive index layer may be formed by a gas phase method (such as a vacuum vapor deposition, sputtering, ion plating, or plasma CVD method). The low refractive index layer is preferably formed by a coating method since the layer can be formed at low costs.

The thickness of the low-refractive-index layer is preferably from 30 to 200 nm, more preferably from 50 to 150 nm, and most preferably from 60 to 120 nm.

[Hard Coat Layer]

A hard coat layer is formed on the surface of the transparent support in order to give physical strength to the antireflection film. It is particularly preferable to form the hard coat layer between the transparent support and the high refractive index layer.

The hard coat layer is preferably formed by crosslinking reaction or polymerizing reaction of a curable compound through light and/or heat. The curable functional group thereof is preferably a photopolymerizable functional group. An organic metal compound which contains a hydrolyzable functional group is preferably an organic alkoxysilyl compound.

Specific examples of these compounds are the same as exemplified as the high refractive index layer.

Specific examples of the composition which constitutes the hard coat layer include compositions described in JP-A-2002-144913 and 2000-9908, and WO 02/46617.

The high refractive index layer can function as a hard coat layer also. In this case, it is preferable to use the manner described about the high refractive index layer to disperse particles finely to be incorporated into the hard coat layer.

The hard coat layer may contain particles having an average particle size of 0.2 to 10 μm, so as to be caused to function as an anti-glare layer. The anti-glare layer has an anti-glare function (and will be detailed later).

The film thickness of the hard coat layer, which may be appropriately set in accordance with the purpose thereof, is preferably from 0.2 to 10 μm, more preferably from 0.5 to 7 μm.

A mechanical strength of the hard coat layer is preferably H or more, further preferably 2H or more, and most preferably 3H or more in term of the pensile hardness, according to JIS K5400 test. The hard coat layer is better as a test piece thereof for a taber test according to JIS K5400 is less abraded in this test.

[Forward Scattering Layer]

In the case that the cellulose acylate film of the present invention is applied to a liquid crystal display device, a forward scattering layer may be fitted to the film in order to improve the field angle of the display device when the angle of visibility is inclined up and down or right and left. The hard coat layer can have both of a hard coat function and a forward scattering function by dispersing fine particles having different refractive indexes in the hard coat layer.

Examples of literature on this layer include JP-A-11-38208, in which the forward scattering coefficient of a forward scattering layer is specified, JP-A-2000-199809, in which the relative refractive index between transparent resin and fine particles is set into a specified range, and JP-A-2002-107512, in which the haze value of a forward scattering layer is specified to 40% or more.

[Other Layers]

The antireflection film may be further provided with a primer layer, an anti-static layer, an undercoating layer and a protective layer.

[Coating Methods]

The respective layers of the antireflection film can be formed by application, according to any one of dip coat, air knife coat, curtain coat, roller coat, wire bar coat, gravure coat, micro gravure coat, and extrusion coat (described in U.S. Pat. No. 2,681,294) methods.

[Antiglare Function]

The anti-reflection film may have an antiglare function for scattering light from the outside. The antiglare function can be obtained by making unevenness in a surface of the anti-reflection film. In the case that the anti-reflection film has the antiglare function, the haze of the anti-reflection film is preferably 3 to 30%, more preferably 5 to 20%, and most preferably 7 to 20%.

In order to form irregularities in the surface of the antireflection film, any method capable of forming the irregularities and keeping the resultant surface form sufficiently can be used. Examples of the method include a method of using fine particles in the low refractive index layer to form irregularities in the surface of the film (see, for example, JP-A-2000-271878); a method of adding a small amount (0.1 to 50% by mass) of relatively large particles (particle size: 0.05 to 2 μm) to the layer (high refractive index layer, middle refractive index layer or hard coat layer) to be formed beneath the low refractive index layer so as to form a surface uneven film, and then forming the low refractive index layer thereon while keeping this surface uneven form (see, for example, JP-A-2000-281410, JP-A-2000-95893, JP-A-2001-100004, and JP-A-2001-281407); and methods of transferring uneven forms physically onto the surface of a formed topmost layer (antifouling layer) by coating (see, for example, JP-A-63-278839, JP-A-11-183710 and JP-A-2000-275401 as embossing methods).

The method of measurement used in this specification is described below. In any one of the measuring methods (1) to (8), a system composed only of cellulose acylate and a solvent, wherein no additive is added, is used, and the concentration of the cellulose acylate is set to 15% by mass.

(1) Exothermic Peak

A DSC is used for measurement according to the following method.

(i) Into a closed aluminum pan (Al-15 model, manufactured by Seiko Instruments Inc.) is put 20 to 30 mg of a sample at 25° C. and 10% R.H. (to prevent the sample from absorbing moisture).

(ii) The DSC (2200 model Thermal Analyst, manufactured by TA Instruments Co.) is used for measurement while the sample is cooled from 40 to −50° C. at a rate of −1° C./min.

(iii) The base line from −20 to 0° C. is straightly extrapolated toward higher temperatures, to obtain the area of a peak formed at an exothermic side to this base line between 0 and 40° C. From this, the calorific value (J/g) of the peak is obtained.

(2) Infrared Spectrum Intensity Ratio of a Dope (First Embodiment of the Present Invention)

(i) A dope is divided into two, and one is left as it is. Boric acid is added to the other, at a ratio of 1.5% by mass of the cellulose acylate. Thereafter, the solution is sufficiently stirred and allowed to stand still at 25° C. for 3 hours or more.

(ii) Two plates, 3 cm square, are cut as window plates from a 4-inch silicon wafer.

(iii) The window plates are used to measure the spectrum of the background. The IR spectrum of the dope is measured as follows:

The dope having a weight of 1 to 3 g is sandwiched between the window plates, and a load of 20 to 30 kg is applied thereto, to stretch the dope uniformly on the entire inner surfaces of the window plates.

The IR spectrum of this sample is measured by a transmission method under the following conditions:

IR spectroscope: 710 model, FT-IR, manufactured by Nicolet Co.
Resolution: 4 cm$^{-1}$
The number of integrations: 200
Measurement temperature: 25° C.

(iv) The average of intensities from 3280 to 3320 cm$^{-1}$ is linked to that of intensities from 3720 to 3760 cm$^{-1}$ through a straight line, and the line is used as a base line. From this base line, the absorbance of the peak at each wave number is obtained.

(3) Absorbance (i) A dope is filled in a glass cell of 1 cm square with a cap for a spectrophotometer.

(ii) A batt containing ethanol is placed in a temperature-controlled circulating bath, and the aforementioned cell is dipped in the batt. This method prevents a cell from dew condensation. If a surface of the cell is frosted, the cell is dipped in the batt for 5 minutes, and the same operation is repeated.

(iii) After dipping for 5 minutes or more, a cell is taken out, and the cell, without being wiped is directly used for measurement using a self-recording spectrophotometer that has already completed background correction (Model UV-2100, made by Shimadzu) under the following conditions:

Reference: an empty glass cell well matching the glass cell filled with a dope.
Measuring wavelength: 550 nm (iv) The same sample is measured with sequential cooling from 40° C.

(4) Substitution Degree of Cellulose Acylate

The acyl substitution degree in the 2-, 3-, and 6-position of cellulose acylate was measured in terms of $^{13}$C-NMR according to a method described in Carbohydr. Res. 273 (1995) 83-91 (Tezuka et al.).

(5) Polymerization Degree (DP) of Cellulose Acylate

About 0.2 g of absolute dry cellulose acylate was precisely weighed and dissolved in 100 ml of a mixed solvent of methylene chloride/ethanol (9/1 by mass). Drop second numbers of the resulting solution and the mixed solvent at 25° C. were each measured using an Ostwald's viscometer. The degree of polymerization was measured according to the following formula:

$\eta rel = T/T0;$ $[\eta] = (ln \eta rel)/C;$ and $DP = [\eta]/Km;$ wherein, T is drop second number of measurement sample; T0 is drop second number of simple solvent; C is concentration (g/l); and Km: $6 \times 10^{-4}$.

(6) X-Ray Diffraction (i) A sample is placed in a copper sample pan that is a copper plate having an outline dimension of 15 mm×30 mm×3 mm, with a hole, of 10 mm×25 mm×1 mm, for placement of a sample.

(ii) A sample is placed in the hole to be 1 mm in thickness, and immediately covered all over the surface with a 6-μm-thick biaxially oriented PET film.

(iii) This sample is measured using an X-ray diffraction apparatus equipped with a cooling stage (RINT-ULTIMA (trade name) made by K. K. Rigaku) while cooling at 50° C. under a nitrogen atmosphere (Cu Kα ray: 40 kV, 50 mA).

(iv) Relative intensities and full widths at half maximum are measured as follows:

A height Hp of the maximum diffraction peak (B) appearing at 2θ=25 degrees to 29 degrees originating from PET (a height (intensity) of the maximum peak from the baseline, provided that a straight line connecting between 2θ=25 degrees and 2θ=29 degrees is a baseline) is measured. The width (2θ) of a peak at half of the height is defined as a full width at half maximum.

A height Hs of a diffraction peak (A) (a half width is from 0.1 degrees to 2 degrees) appearing at 2θ=20 degrees to 25 degrees (a height (intensity) of the peak from the baseline, provided that a straight line connecting both sides of the peak is a baseline) is measured. The width (2θ) of a peak at half of the height is defined as a full width at half maximum.

Hs/Hp is defined as a relative intensity.

(7) tanδ, G' and G" Measured in a Closed System (i) A measurement using a viscoelasticity-measuring instrument (Model CVO-10, made by Bohlin Instruments) under the following conditions:

cone: 40 mmφ, parallel plate, gap=500 μm

A glass-cover is put on the cone and the cone sealed up. Further, the rotation axis of the cone is sealed with a solvent of the dope.

Cooling is done by passing a refrigerant from a temperature-controlled circulating bath to a measuring section (a jacket under the cone), thereby maintaining a constant measuring temperature.

A measurement is done by measuring 20 points in terms of strain=1% and frequency=1 Hz. G' (Elastic Modulus) and G" (Viscous Modulus) are measured, and their mean values are each calculated. From the ratio of these values (G"/G'), tanδ can be obtained.

(ii) A measurement is done with sequential cooling from 20° C.

(8) Diffusion Constant

A dope of cellulose acylate having a concentration of 15% by mass is prepared. The dopes, maintained at room temperature and −50° C., are each subjected to measurement using an instrument to measure dynamic light scattering. Specifically, the aforementioned dope is measured using a concentrate system particle-size analyzer FPAR-Model 1000, made by Otsuka Denshi K. K. Namely, the dope is placed in a cell, and the cell is dipped in a thermostat maintained at a fixed temperature, and then a dilute system probe is dipped therein for measurement.

The results of measurement that are shown by a particle-size distribution are converted into a diffusion constant using Stokes' equation described below.

$D = kT/(6\pi \cdot \eta \cdot \xi)$

Wherein D represents a diffusion constant (cm$^2$/s), k represents the gas constant, η represents the viscosity (poise) of a solvent at a measuring temperature, T represents an absolute temperature, and ξ represents particle size (radius).

(9) IR (Infrared Spectrum) Measurement (Second Embodiment of the Present Invention)

A specific cellulose acylate is dissolved in dichloromethane, to prepare a concentration of 5% by mass. Specifically, dissolution was done by the method of mixing them and leaving them at room temperature for 2 hours, to swell the cellulose acylate, and then the mixture was cooled at −70° C. for 12 hours or more, followed by heating up to a room temperature.

A dope was sandwiched between silicon wafers, and installed in a temperature-controlling unit (FP-90 control processor plus cooling unit, made by Mettler Toledo). The dope was measured integrating 40 times by means of an FT-IR spectroscope.

The data thus obtained by measurement were shown by absorbance. The height of a peak in the vicinity of 1753 cm$^{-1}$ was measured as absorbance from the baseline connecting 1800 cm$^{-1}$ and 1680 cm$^{-1}$, whereas the height of a peak in the vicinity of 1056 cm$^{-1}$ was measured as absorbance from the baseline connecting the minimum point between 1220 cm$^{-1}$ and 1150 cm$^{-1}$, and the minimum point between 1000 cm$^{-1}$ and 900 cm$^{-1}$.

In the cellulose acylate-series dope of the present invention, optical unevenness and thermal expansion unevenness are not easily exhibited when a film is formed from the dope. A cellulose acylate film excellent in optical properties, resistance against the generation of strain, and other properties can be obtained, using the dope.

When the cellulose acylate-series dope of the present invention is used, an optical unevenness and an uneven heat-shrinkage hardly arise at the time of film production, so that a cellulose acylate film having both excellent optical characteristics and properties necessary to a support can be obtained. Namely, according to the present invention, both dopes and cellulose acylate films having the above-mentioned excellent properties can be obtained.

The present invention is explained in detail with reference to Examples below. However, the present invention should not be construed to be limited thereto.

EXAMPLES

Example 1

1. Production of Cellulose Acylate Film (1) Cellulose Acylate

Cellulose acylates that are different in the kind and/or substitution degree of acyl groups as listed in Table 1 were prepared. In the preparation, sulfuric acid as a catalyst was added in the proportion of 7.8 parts by mass to 100 parts by mass of cellulose. Further, carboxylic acids corresponding to the acyl substitutents were added and subjected to acylation reaction at 40° C. At this point, the kind and/or substitution degree of acyl groups were controlled by the kind and/or amount of the carboxylic acids. After acylation, a ripening was performed at 40° C.

Further, low molecular weight components of the cellulose acylate were eliminated by washing with acetone, thereby to prepare samples different in average viscometric degree of polymerization as listed in Table 1.

To this sample were added collected wastes at an amount described in Table 1. The collected wastes used had the same composition as cellulose acylate which had not yet been used. That is, scraps obtained by trimming the cast film having this composition were used.

(2) Dissolution of Cellulose Acylate (i) Solvent

The solvents used were selected from those described below and listed in Table 1.

(a) Non-Chlorine-Series Flesh Solvents:

Methyl acetate/acetone/ethanol/butanol (79/8/7/6, part by mass)

(b) Chlorine-Series Flesh Solvents:

Dichloromethane/methanol/ethanol/butanol (80/10/5/5, part by mass)

(ii) Swelling

Cellulose acylates described in Table 1 were added with stirring to the above-mentioned solvent so as to become a concentration of 15% by mass of the solvent. After completion of addition, the stirring was stopped and a swelling treatment was carried out for 2 hour in each stage at the temperature of 25° C. to prepare slurries.

(iii) Dissolution

A device illustrated in FIG. 1 in JP-A-10-324774 was used to introduce this slurry into a kneader equipped with a cooling jacket and dissolve the cellulose acylate. At this time, the temperature of the cooling jacket was set to −70° C., and the time for causing the cellulose acylate to stay in the jacket was set to 30 minutes.

The dope fed out from the kneader was passed through a kneader equipped with a temperature-adjusted jacket while the temperature of the dope was raised to room temperature. At this time, the temperature-adjusted jacket was divided to the number of steps shown in Table 1, and the temperature of the dope was raised while the dope was caused to stay in each of the steps for 10 minutes at temperatures described in Table 1.

The IR absorbance, the absorbance, and the differential scanning calorie of the thus-obtained dope were measured, and the results are shown in Table 2.

Thereafter, to the dope were added a plasticizer a (triphenylphosphate (8% by mass of cellulose acylate)), a plasticizer b (biphenyl-diphenyl phosphate (4% by mass of cellulose acylate)), a ultraviolet-absorbing agent a (2,4-bis-(n-octylthio)-6-(4-hydroxy-3,5-di-tert-butylanilino)-1,3,5-triazine (1% by mass of cellulose acylate)), a ultraviolet-absorbing agent b (2(2'-hydroxy-3',5'-di-tert-butylphenyl)-5-chlorobenzotriazole (1% by mass of cellulose acylate)), a ultraviolet-absorbing agent c (2 (2'-hydroxy-3',5'-di-tert-amylphenyl)-5-chlorobenzotriazole (1% by mass of cellulose acylate)), fine particles (silicon dioxide (grain size 20 nm), Mohs' hardness about 7) (0.25% by mass of cellulose acylate), and ethyl citrate ester (a mixture ratio of monoester to diester=1:1) (0.2% by mass of cellulose acylate). Then, the mixture was well stirred for 2 hours at 50° C.

Thereafter, the mixture was filtered through a filter paper having absolute filtration rate of 0.01 mm (No. 63 (trade name) made by Toyo Roshi Kaisha, Ltd.), and then a filter paper having absolute filtration rate of 2.5 μm (FH025 (trade name) made by Pall Corporation). The thus-obtained dope, once after pressing at 1 MPa and warming at 110° C., was released to atmosphere of an ordinary pressure (0.1 MPa), thereby to evaporate organic solvents. Thus, a dope of cellulose acylate having a concentration of 24% by mass was obtained. Further, 2% by mass of butanol on the basis of a solid content of cellulose acylate was added gradually to the dope solution with well stirring to obtain a homogeneous solution.

TABLE 1

| | Cellulose acylate | | | | | | |
|---|---|---|---|---|---|---|---|
| | Acetate group | Substituent except for acetate group | | All substitution degree (SA + SB) | Substitution degree at 6-position (S6) | Polymerization degree | Ratio of collected wastes (wt %) |
| | Substitution degree (SA) | Kind | Substitution degree (SB) | | | | |
| This invention-1 | 2.80 | — | 0 | 2.8 | 0.91 | 310 | 30 |
| This invention-2 | 2.80 | — | 0 | 2.8 | 0.91 | 310 | 60 |
| This invention-3 | 2.80 | — | 0 | 2.8 | 0.91 | 310 | 10 |
| Comparative example-1 | 2.80 | — | 0 | 2.8 | 0.91 | 310 | 0 |
| This invention-4 | 2.80 | — | 0 | 2.8 | 0.91 | 310 | 75 |
| This invention-5 | 2.80 | — | 0 | 2.8 | 0.91 | 310 | 75 |
| Comparative example-2 | 2.80 | — | 0 | 2.8 | 0.91 | 310 | 75 |
| This invention-6 | 2.80 | — | 0 | 2.8 | 0.95 | 310 | 75 |
| This invention-7 | 2.80 | — | 0 | 2.8 | 0.88 | 310 | 75 |
| This invention-8 | 2.80 | — | 0 | 2.8 | 0.85 | 310 | 75 |
| This invention-9 | 2.60 | — | 0 | 2.60 | 0.93 | 370 | 75 |
| This invention-10 | 2.98 | — | 0 | 2.98 | 0.93 | 290 | 75 |
| This invention-11 | 2.80 | — | 0 | 2.8 | 0.91 | 310 | 75 |
| This invention-12 | 2.10 | Butylate | 0.7 | 2.81 | 0.92 | 340 | 75 |
| This invention-13 | 2.20 | Propionate | 0.4 | 2.6 | 0.92 | 340 | 75 |
| This invention-14 | 2.80 | — | 0 | 2.8 | 0.91 | 310 | 75 |
| This invention-15 | 2.80 | — | 0 | 2.8 | 0.91 | 310 | 75 |

| | Preparation condition of the dope | | | | |
|---|---|---|---|---|---|
| | | Cooling/heat-up dissolution and heat-up condition | | | |
| | Solvent | First step temperature (inlet side) (° C.) | Second step temperature (° C.) | Third step temperature (° C.) | Forth step temperature (outlet side) (° C.) |
| This invention-1 | Non-chlorine-series | −70 | −50 | −30 | −10 |
| This invention-2 | Non-chlorine-series | −70 | −50 | −30 | −10 |
| This invention-3 | Non-chlorine-series | −70 | −50 | −30 | −10 |
| Comparative example-1 | Non-chlorine-series | −70 | −50 | −30 | −10 |
| This invention-4 | Non-chlorine-series | −70 | −40 | −10 | |
| This invention-5 | Non-chlorine-series | −70 | −65 | −60 | −55 |
| Comparative example-2 | Non-chlorine-series | −70 | −70 | −70 | |
| This invention-6 | Non-chlorine-series | −70 | −50 | −30 | −10 |
| This invention-7 | Non-chlorine-series | −70 | −50 | −30 | −10 |
| This invention-8 | Non-chlorine-series | −70 | −50 | −30 | −10 |
| This invention-9 | Non-chlorine-series | −70 | −50 | −30 | −10 |
| This invention-10 | Non-chlorine-series | −70 | −50 | −30 | −10 |
| This invention-11 | Chlorine-series | −70 | −40 | −10 | |

TABLE 1-continued

| | | | | | |
|---|---|---|---|---|---|
| This invention-12 | Non-chlorine-series | −50 | −30 | −10 | |
| This invention-13 | Non-chlorine-series | −90 | −70 | −50 | −20 |
| This invention-14 | Non-chlorine-series | −70 | −50 | −30 | −10 |
| This invention-15 | Non-chlorine-series | −70 | −50 | −30 | −10 |

(3) Formation of a Cellulose Triacetate Film

The above-mentioned dope was heated to 50° C., and cast on a mirror plane stainless steel support having a band length of 50 m (the temperature of the support was set to 25° C.) through a casting die. The die was of a form similar to that described in JP-A-11-314233. The casting speed and the casting width at this time were set to 45 m/minute and 200 cm, respectively. The temperature of the space in the casting section was set to 35° C. The cellulose acylate film that was being cast and rotated was peeled off from the band at a position 50 cm short of the casting section. Both side ends of the film were clipped with pin tenters. Thereafter, the cellulose acylate film, held by the pin tenters, was carried to a drying zone. In initial drying, a dry air of 45° C. temperature was sent. The film was taken off from the pin tenters, and dried at 110° C. for 5 minutes, and at 145° C. (film temperature, about 140° C.) for 10 minutes, while the film was carried by means of a roller. In this way, a cellulose triacetate film (film thickness, 80 μm) was obtained. Both side ends of the resultant sample were trimmed by 3 cm. The trimmed film pieces were collected and cut. The cut pieces were used as collected wastes. A portion 2 to 10 mm inward from one end of the film was knurled to have a height of 100 μm, and then the film was wound, at a length of 3,000 m, into a roll form.

About the thus-obtained film (sample film), the retardation unevenness (Rth unevenness) thereof was measured by the following method. The result is shown in Table 2.

(i) The sample film was conditioned at 25° C. and 60% RH for 3 hours or more.

(ii) An automatic birefringence meter (KOBRA-21ADHPR, manufactured by Oji Scientific Instruments) was used to measure the retardation values of the sample, at 25° C. and 60% RH, at a wavelength of 550 nm, in a direction perpendicular to the sample film surface, a direction having an angle of +40 degrees to the sample film surface, and a direction having an angle of −40 degrees to the sample film surface. From the three values, the Rth was calculated.

(iii) The Rth values of points obtained by dividing the film into 10 equal portions along the width direction of the film were measured 10 times, at intervals of 10 m in the longitudinal direction. The difference between the maximum value and the minimum value, out of the measured values at the 100 points, was defined as the Rth unevenness of the film.

Furthermore, the unevenness of the thermal expansion coefficient of the film was measured by the following method.

(i) The sample film was conditioned at 25° C. and 10% RH for 3 hours or more.

(ii) This was cut into pieces 3 mm wide and 35 mm long at 25° C. and 10% RH. The pieces were chucked at intervals of 25 and 4 mm (in order to prevent the sizes of the pieces from being changed by temperature rise and dehumidification in TMA measurement).

(iii) This was promptly set into a TMA (2200 model Thermal Analyst, manufactured by TA Instruments Co.), and then heated from 25 to 100° C. at a rate of 3° C./min. under a tensile strength of 0.04 N.

(iv) From the gradient of a straight line for linking values at 50 and 80° C. to each other, the thermal expansion coefficient of the film was obtained.

(v) At the 100 measuring points, which were obtained by dividing the film into ten equal portions along the width direction of the film and making measurements 10 times at intervals of 10 m in the longitudinal direction, calories were measured in the MD direction and TD direction. The difference between the maximum value and the minimum value was obtained about each of the MD and TD directions. The resultant differences were defined as the thermal expansion unevenness of the MD and the TD, respectively.

As is clear form the results in Table 2, the cellulose acylate film of this invention was better in both of thermal expansion unevenness and optical unevenness (Rth unevenness) than films of Comparative Examples. The dope of this invention exhibited an exothermic peak specified in the present invention to form target hydrogen bonds. On the other hand, each of the dopes of Comparative Examples exhibited no exothermic peak on which the formation of a hydrogen bond was reflected.

Further, according to Example 1 of JIII Kokai-Giho (Kogi No. 2001-1745), three-layer co-casting was carried out using the aforementioned dopes. Similar to the above Example, excellent results were obtained.

In addition, cellulose acylate films having a film thickness of 40 μm, 60 μm, 100 μm and 120 μm respectively were prepared in the same manner as the above. Similar to the above Example, excellent performances were obtained.

On the other hand, Comparative example 3 does not follow the present invention. The Comparative Example 3 corresponds to Examples 1 of JP-A-2002-160242.

TABLE 2

| | Physical property of dope | | | | Absorbance | |
|---|---|---|---|---|---|---|
| | DSC mesurement | | | | | Absorbance |
| | Calorific value (J/g) | Peak temperature (° C.) | IR intensity ratio | | Minimum absorbance (Am) | at 40° C. (A40)-(Am) |
| | | | B1/A1 | B2/A2 | | |
| This invention-1 | 6.3 | 33 | 1.56 | 1.52 | 0.08 | 0.04 |
| This invention-2 | 9.8 | 38 | 2.88 | 2.92 | 0.28 | 2.8 |
| This invention-3 | 1.2 | 5 | 1.25 | 1.22 | 0.05 | 0.02 |
| Comparative example-1 | 0 | — | 1 | 1 | 0 | 0 |
| This invention-4 | 7.2 | 36 | 2.01 | 2.21 | 0.11 | 0.72 |
| This invention-5 | 3.4 | 25 | 1.33 | 1.43 | 0.04 | 0.03 |
| Comparative example-2 | 0 | — | 1 | 1 | 0 | 0 |
| This invention-6 | 4.5 | 20 | 1.28 | 1.27 | 0.05 | 0.03 |
| This invention-7 | 7.8 | 25 | 1.88 | 1.78 | 0.12 | 0.34 |
| This invention-8 | 1.1 | 12 | 1.21 | 1.21 | 0.1 | 0.02 |
| This invention-9 | 7.4 | 34 | 1.68 | 1.78 | 0.12 | 0.15 |
| This invention-10 | 5.1 | 28 | 1.44 | 1.41 | 0.07 | 0.03 |
| This invention-11 | 3.2 | 15 | 1.2 | 1.12 | 0 | 0.02 |
| This invention-12 | 2.8 | 11 | 1.23 | 1.34 | 0.26 | 1.89 |
| This invention-13 | 3.4 | 9 | 1.22 | 1.3 | 0.28 | 1.58 |
| This invention-14 | 6.3 | 33 | 1.56 | 1.52 | 0.08 | 0.04 |
| This invention-15 | 6.3 | 33 | 1.56 | 1.52 | 0.08 | 0.04 |
| This invention-16 | 5.3 | 31 | 1.5 | 1.48 | 0.07 | 0.04 |
| Comparative example-3 | 0 | — | 1 | 1 | 0.07 | 0 |

| | Physical property of cellulose acylate | | | | Stretching method | Unevenness of liquid crystal display device | |
|---|---|---|---|---|---|---|---|
| | thermal expansion unevenness | | | | | | |
| | MD (ppm/° C.) | TD (ppm/° C.) | Rth unevenness (nm) | Saponification method | of polarizing plate | OCB type (%) | VA type (%) |
| This invention-1 | 3 | 3 | 2 | Coating saponification | Oblique stretching | 0 | 0 |
| This invention-2 | 1 | 1 | 1 | Coating saponification | Oblique stretching | 0 | 0 |
| This invention-3 | 7 | 6 | 3 | Coating saponification | Oblique stretching | 0.5 | 0.5 |
| Comparative example-1 | 25 | 27 | 15 | Coating saponification | Oblique stretching | 9 | 10 |
| This invention-4 | 3 | 3 | 2 | Coating saponification | Oblique stretching | 0 | 0 |
| This invention-5 | 4 | 3 | 3 | Coating saponification | Oblique stretching | 0.1 | 0.2 |
| Comparative example-2 | 32 | 35 | 17 | Coating saponification | Oblique stretching | 9 | 8 |
| This invention-6 | 4 | 3 | 3 | Coating saponification | Oblique stretching | 0 | 0 |
| This invention-7 | 2 | 2 | 1 | Coating saponification | Oblique stretching | 0 | 0 |
| This invention-8 | 9 | 8 | 5 | Coating saponification | Oblique stretching | 0.7 | 0.8 |
| This invention-9 | 3 | 2 | 0 | Coating saponification | Oblique stretching | 0 | 0 |
| This invention-10 | 5 | 4 | 2 | Coating saponification | Oblique stretching | 0 | 0 |
| This invention-11 | 9 | 9 | 7 | Coating saponification | Oblique stretching | 1.7 | 1.8 |
| This invention-12 | 7 | 6 | 8 | Coating saponification | Oblique stretching | 1 | 0.9 |
| This invention-13 | 8 | 6 | 7 | Coating saponification | Oblique stretching | 0.9 | 1 |
| This invention-14 | 3 | 3 | 2 | Dip saponification | Oblique stretching | 0 | 0 |
| This invention-15 | 3 | 3 | 2 | Coating saponification | Parallel stretching | 0.4 | 0.5 |
| This invention-16 | 3 | 3 | 2 | Coating saponification | Oblique stretching | 0 | 0 |
| Comparative example-3 | 29 | 31 | 19 | Coating saponification | Oblique stretching | 12 | 11 |

(4) Saponification of Cellulose Acylate Films

Saponification was carried out according to any one of the methods described below. Table 2 describes which method was used.

(i) Coating Saponification

To 80 parts by mass of iso-propanol, 20 parts by mass of water was added, and KOH was dissolved therein so as to become 1.5N. The solution temperature-controlled to 60° C. was used as a saponifying solution. The saponifying solution was coated on a cellulose acylate film of 60° C. in a coating amount of 10 g/m, followed by saponification for 1 minute.

Thereafter, a warm water of 50° C. was sprayed upon the film using a spray at a rate of 10 L/m min for 1 minute to wash the film.

(ii) Dip Saponification

A 1.5N aqueous solution of NaOH was used as a saponifying solution.

The solution was temperature-controlled to 60° C., and a cellulose acylate film was dipped therein for 2 minutes.

Thereafter, the film was dipped in a 0.1N sulfuric acid aqueous solution for 30 seconds, and then passed through a washing bath.

2. Preparation of Polarizing Plates (1) Preparation of Polarizing Layers

20 μm thick polarizing layers were prepared according to any one of the methods described below (described in Table 2).

(i) Oblique Stretching Method

A film was stretched so that the stretching axis became an oblique angle of 45 degree using a tenter according to Example 1 of JP-A-2002-086554.

(ii) Parallel Stretching Method

A film was stretched in the length direction applying a difference of peripheral speed between two pairs of nip rollers according to Example 1 of JP-A-2001-141926.

(2) Laminating

The thus-obtained polarizing layer and the aforementioned saponification-processed cellulose acylate film were laminated with a 3% aqueous solution of polyvinyl alcohol (PVA-117H (trade name) made by KURARAY CO. LTD) as adhesives so that axis of polarization and the length direction of the cellulose acylate film was at an angle of 45 degree. Excellent performances were obtained according to the present invention.

3. Preparation of Optical Compensation Film (i) The first transparent support used in Example 1 of JP-A-11-316378 was replaced with the cellulose acylate film of the present invention. Thereby an excellent optical compensation film was successfully prepared.

(ii) The cellulose triacetate film (made by Fuji Photo Film Co. Ltd.) that was used in Example 1 of JP-A-7-333433 was replaced with the cellulose acylate film of the present invention to prepare an optical compensation filter film. It was confirmed that the thus-filter film had an excellent view angle in both bilateral directions and vertical directions.

4. Preparation of Low Reflective Films

The cellulose acylate film of the present invention was used to prepare low reflective films according to Example 47 of JIII Kokai-Giho (Kogi No. 2001-1745). Thereby excellent optical performances were obtained.

5. Preparation of Liquid Crystal Display Devices

The aforementioned polarizing plates of the present invention were applied to liquid crystal display devices described in Example 1 of JP-A-10-48420, optical anisotropy layers containing discotic liquid crystal molecules described in Example 1 of JP-A-9-26572, orientation films coated with polyvinyl alcohol, 20 inch-VA type liquid crystal display devices described in FIGS. 2-9 of JP-A-2000-154261, and 20 inch-OCB type liquid crystal display devices described in FIGS. 10-15 of JP-A-2000-154261. Further, the low reflective films of the present invention were applied to the outermost layer of these liquid crystal display devices to evaluate performances described below. As a result, such excellent visibility as shown in Table 2 was obtained.

Evaluation Method

One hundred sets of liquid crystal display devices produced by collecting samples at will from the original cellulose acylate film along the longitudinal direction and the width direction thereof, the sets being kept at 20° C., were switched on at 40° C. Images displayed immediately thereafter were watched at angles of 60 degrees from upper and lower sides and right and left sides. Display unevenness of the images was evaluated with the naked eye, whereby effect generated when the liquid crystal display screens underwent large thermal expansion can be evaluated from the oblique sides, wherein Rth unevenness can most easily be detected. About the liquid crystal display device wherein the largest unevenness area was generated out of these display devices, the display-unevenness-generated area was represented in percentage. That is, unevenness of the original cellulose acylate film was evaluated over a wide area along the longitudinal and width directions. The films to which the present invention was applied exhibited good properties.

In addition, liquid crystal display devices were prepared in the same manner as the above, except for using a three layer-co-casting cellulose acylate film, and cellulose acylate films having a film thickness of 40 μm, 60 μm, 100 μm and 120 μm respectively. As a result, similarly excellent performances were obtained.

6. Application to Supports of Silver Halide Photosensitive Materials

A 120 μm thick cellulose acylate film of the present invention was used in Examples of 63, 64 and 65 of JIII Kokai-Giho (Kogi No. 2001-1745). As a result, even after a long-term storage (50° C. 500 hours), excellent performances were obtained.

Example 2

1. Production of Cellulose Acylate Film (1) Cellulose Acylate

Cellulose acylates that are different in the kind and/or substitution degree of acyl groups as listed in Table 3 were prepared same as Example 1.

Further, low molecular weight components of the cellulose acylate were eliminated by washing with acetone, thereby to prepare samples different in average viscometric degree of polymerization as listed in Table 3.

In addition, according to the aforementioned method, peak intensities of IR at 25° C. and −50° C., i.e., I(25) and I(−50) were measured respectively. A ratio of the peak intensities of IR (I(−50)—I(25)) was calculated and described in Table 3.

(2) Dissolution of Cellulose Acylate (i) Solvent

The solvents used were selected from those described below and listed in Table 4, except for Sample Nos. (This invention-2-20) and (Comparative example-2-4).

(a) Non-Chlorine-Series Flesh Solvents;

Methyl acetate/acetone/ethanol/butanol (81/8/7/6, part by mass)
  Non-Chlorine-Series Recovery Solvents:

Methyl acetate/acetone/ethanol/butanol (81/8/7/6, part by mass)

(b) Chlorine-Series Flesh Solvents:

Dichloromethane/methanol/ethanol/butanol (80/10/5/5, part by mass)
  Chlorine-Series Recovery Solvents:

Dichloromethane/methanol/ethanol/butanol (80/10/5/5, part by mass)

In This invention-2-20 and Comparative example-2-4, the solvent having the solvent composition of this invention 1 in JP-A-2002-160242 was used.

At this time, a recovery solvent was added to each solvent in the proportion described in Table 4 (the proportion of addition was made equal in each solvent). The recovery solvent herein used is composed of components separated by fractional distillation of a solvent recovered in the operation of a film production described later. The fractional distillation is carried out in order to separate each primary component. However, the aforementioned oxides, acetic acid and so on are not completely fractionated, so that they get mixed in the components.

Further, inorganic salts listed in Table 4 were added.

(ii) Swelling

Cellulose acylates described in Table 3 were added with stirring to the above-mentioned solvent so as to become a concentration of 15% by mass of the solvent. After completion of addition, the stirring was stopped and a swelling treatment was carried out for 1 hour in each stage at the temperature described in Table 4 to prepare slurries.

(iii) Dissolution

The thus-prepared slurries ware introduced to a kneader equipped with a cooling jacket and dissolved using an apparatus described in FIG. 1 of JP-A-10-324774. In this time, the cooling jacket was divided as described in Table 4, thereby to regulate a temperature in the individual jacket. A residence time was controlled so as to spend 30 minutes on a whole residence time, and divided equally in each temperature zone.

A dope taken out from the kneader was heated up to a room temperature, while passing it through a kneader equipped with a temperature-controlled jacket in the same way as described above.

G', tanδ, absorbance, XD, ΔlogD of the thus-obtained dope were measured. The results were shown in Table 5.

Thereafter, to the dope were added the plasticizer a, the plasticizer b, the ultraviolet-absorbing agent a, the ultraviolet-absorbing agent b, the ultraviolet-absorbing agent c, the fine particles, and the ethyl citrate ester same as Example 1. Then, the mixture was well stirred for 2 hours at 50° C.

Thereafter, the mixture was filtered through a filter paper having absolute filtration rate of 0.01 mm (No. 63 (trade name) made by Toyo Roshi Kaisha, Ltd.), and then a filter paper having absolute filtration rate of 2.5 μm (FH025 (trade name) made by Pall Corporation). The thus-obtained dope, once after pressing at 1 MPa and warming at 110° C., was released to atmosphere of an ordinary pressure (0.1 MPa), thereby to evaporate organic solvents. Thus, a dope of cellulose acylate having a concentration of 24% by mass was obtained. Further, 2% by mass of butanol on the basis of a solid content of cellulose acylate was added gradually to the dope solution with well stirring to obtain a homogeneous solution.

TABLE 3

| | Cellulose acylate | | | | | | | |
|---|---|---|---|---|---|---|---|---|
| | Acetate group | Substituent except for acetate group | | All substitution degree | Substitution degree at 6- | Polymerization | IR intensity ratio | |
| | Substitution degree (SA) | Kind | Substitution degree (SB) | (SA + SB) | position (S6) | degree | I (25) | I (−50)-I (25) |
| This invention 2-1 | 2.80 | — | 0 | 2.8 | 0.91 | 310 | 0.58 | 0.7 |
| This invention 2-2 | 2.80 | — | 0 | 2.8 | 0.91 | 310 | 0.58 | 0.7 |
| This invention 2-3 | 2.80 | — | 0 | 2.8 | 0.91 | 310 | 0.58 | 0.7 |
| Comparative example 2-1 | 2.80 | — | 0 | 2.8 | 0.91 | 310 | 0.58 | 0.7 |
| This invention 2-4 | 2.80 | — | 0 | 2.8 | 0.91 | 310 | 0.58 | 0.7 |
| This invention 2-5 | 2.80 | — | 0 | 2.8 | 0.91 | 310 | 0.58 | 0.7 |
| This invention 2-6 | 2.80 | — | 0 | 2.8 | 0.91 | 310 | 0.58 | 0.7 |
| This invention 2-7 | 2.80 | — | 0 | 2.8 | 0.91 | 310 | 0.58 | 0.7 |
| Comparative example 2-2 | 2.80 | — | 0 | 2.8 | 0.91 | 310 | 0.58 | 0.7 |
| This invention 2-8 | 2.80 | — | 0 | 2.8 | 0.91 | 310 | 0.58 | 0.7 |
| This invention 2-9 | 2.80 | — | 0 | 2.8 | 0.91 | 310 | 0.58 | 0.7 |
| Comparative example 2-3 | 2.80 | — | 0 | 2.8 | 0.91 | 310 | 0.58 | 0.7 |
| This invention 2-10 | 2.80 | — | 0 | 2.8 | 0.95 | 310 | 0.55 | 1.4 |
| This invention 2-11 | 2.80 | — | 0 | 2.8 | 0.88 | 310 | 0.45 | 0.1 |
| This invention 2-12 | 2.80 | — | 0 | 2.8 | 0.85 | 310 | 0.35 | 0 |
| This invention 2-13 | 2.60 | — | 0 | 2.6 | 0.93 | 370 | 0.65 | 1.1 |
| This invention 2-14 | 2.98 | — | 0 | 2.98 | 0.93 | 290 | 0.45 | 0.8 |
| This invention 2-15 | 2.80 | — | 0 | 2.8 | 0.91 | 310 | 0.58 | 0.7 |

TABLE 3-continued

| | Cellulose acylate | | | | | | | |
|---|---|---|---|---|---|---|---|---|
| | Acetate group Substitution degree (SA) | Substituent except for acetate group Kind | Substituent except for acetate group Substitution degree (SB) | All substitution degree (SA + SB) | Substitution degree at 6-position (S6) | Polymerization degree | IR intensity ratio I (25) | IR intensity ratio I (−50)-I (25) |
| This invention 2-16 | 2.10 | Butylate | 0.7 | 2.8 | 0.92 | 340 | 0.45 | 0.33 |
| This invention 2-17 | 2.20 | Propionate | 0.4 | 2.6 | 0.92 | 340 | 0.4 | 0.26 |
| This invention 2-18 | 2.80 | — | 0 | 2.8 | 0.91 | 310 | 0.58 | 0.7 |
| This invention 2-19 | 2.80 | — | 0 | 2.8 | 0.91 | 310 | 0.58 | 0.7 |
| This invention 2-20 | 2.70 | — | 0 | 2.7 | 0.81 | 300 | 0.46 | 0.45 |
| Comparative example 2-4 | 2.70 | — | 0 | 2.7 | 0.81 | 300 | 0.46 | 0.45 |
| This invention 2-21 | 2.80 | — | 0 | 2.8 | 0.91 | 310 | 0.58 | 0.7 |
| This invention 2-22 | 2.80 | — | 0 | 2.8 | 0.91 | 310 | 0.58 | 0.7 |
| This invention 2-23 | 2.80 | — | 0 | 2.8 | 0.91 | 310 | 0.58 | 0.7 |
| This invention 2-24 | 2.80 | — | 0 | 2.8 | 0.91 | 310 | 0.58 | 0.7 |
| This invention 2-25 | 2.80 | — | 0 | 2.8 | 0.91 | 310 | 0.58 | 0.7 |
| This invention 2-26 | 2.80 | — | 0 | 2.8 | 0.91 | 310 | 0.58 | 0.7 |
| This invention 2-27 | 2.80 | — | 0 | 2.8 | 0.87 | 310 | 0.55 | 0.5 |
| This invention 2-28 | 2.80 | — | 0 | 2.8 | 0.95 | 310 | 0.65 | 0.9 |

TABLE 4

| | Preparation condition of the dope | | | | Swelling treatment | | Cooling/heat-up dissolution | | | |
|---|---|---|---|---|---|---|---|---|---|---|
| | Solvent | Ratio of recovery solvent (wt %) | Addition of inorganic salt Kind | Addition of inorganic salt Addition amount** | First step temperature (° C.) | Different of temperature (Second step temperature)-(First step temperature) (° C.) | First step temperature (inlet side) (° C.) | Second step temperature (° C.) | Third step temperature (outlet side) (° C.) | Different of temperature (Inlet side)-(Outlet side) (° C.) |
| This invention 2-1 | Non-chlorine-series | 75 | — | 0 | 25 | 15 | | | | 20 |
| This invention 2-2 | Non-chlorine-series | 100 | — | 0 | 25 | 15 | −50 | −60 | −70 | 20 |
| This invention 2-3 | Non-chlorine-series | 20 | — | 0 | 25 | 15 | −50 | −60 | −70 | 20 |
| Comparative example 2-1 | Non-chlorine-series | 15 | — | 0 | 25 | 15 | −50 | −60 | −70 | 20 |
| This invention 2-4 | Non-chlorine-series | 75 | — | 0 | 10 | 15 | −50 | −60 | −70 | 20 |
| This invention 2-5 | Non-chlorine-series | 75 | — | 0 | 30 | 15 | −50 | −60 | −70 | 20 |
| This invention 2-6 | Non-chlorine-series | 75 | — | 0 | 25 | 30 | −50 | −60 | −70 | 20 |
| This invention 2-7 | Non-chlorine-series | 75 | — | 0 | 25 | 3 | −50 | −60 | −70 | 20 |
| Comparative example 2-2 | Non-chlorine-series | 75 | — | 0 | 25 | 0 | −50 | −60 | −70 | 20 |
| This invention 2-8 | Non-chlorine-series | 75 | — | 0 | 25 | 15 | −40 | −55 | −70 | 30 |
| This invention 2-9 | Non-chlorine-series | 75 | — | 0 | 25 | 15 | −55 | −58 | −61 | 6 |
| Comparative example 2-3 | Non-chlorine-series | 75 | — | 0 | 25 | 15 | 55 | 57 | 59 | 4 |
| This invention 2-10 | Non-chlorine-series | 75 | — | 0 | 25 | 15 | −50 | −60 | −70 | 20 |
| This invention 2-11 | Non-chlorine-series | 75 | — | 0 | 25 | 15 | −50 | −60 | −70 | 20 |
| This invention 2-12 | Non-chlorine-series | 75 | — | 0 | 25 | 15 | −50 | −60 | −70 | 20 |
| This invention 2-13 | Non-chlorine-series | 75 | — | 0 | 25 | 15 | −50 | −60 | −70 | 20 |
| This invention 2-14 | Non-chlorine-series | 75 | — | 0 | 25 | 15 | −50 | −60 | −70 | 20 |

TABLE 4-continued

| | | Preparation condition of the dope | | | | | | | |
|---|---|---|---|---|---|---|---|---|---|
| | | Swelling treatment | | | | Cooling/heat-up dissolution | | | |
| | | Ratio of recovery solvent (wt %) | Addition of inorganic salt | | First step temperature (° C.) | Different of temperature (Second step temperature)-(First step temperature) (° C.) | First step temperature (inlet side) (° C.) | Second step temperature (° C.) | Third step temperature (outlet side) (° C.) | Different of temperature (Inlet side)-(Outlet side) (° C.) |
| | Solvent | | Kind | Addition amount** | | | | | | |
| This invention 2-15 | Chlorine-series | 75 | — | 0 | 25 | 15 | −50 | −60 | −70 | 20 |
| This invention 2-16 | Non-chlorine-series | 75 | — | 0 | 25 | 15 | −50 | | −70 | 20 |
| This invention 2-17 | Non-chlorine-series | 75 | — | 0 | 25 | 15 | −50 | −60 | −70 | 20 |
| This invention 2-18 | Non-chlorine-series | 75 | — | 0 | 25 | 15 | −50 | −60 | −70 | 20 |
| This invention 2-19 | Non-chlorine-series | 75 | — | 0 | 25 | 15 | −50 | −60 | −70 | 20 |
| This invention 2-20 | Non-chlorine-series* | 75 | — | 0 | 25 | 15 | −50 | −60 | −70 | 20 |
| Comparative example 2-4 | Non-chlorine-series* | 0 | — | 0 | 25 | 0 | −70 | −70 | −70 | 0 |
| This invention 2-21 | Non-chlorine-series | 75 | LiCl | 5 | 25 | 15 | −50 | −60 | −70 | 20 |
| This invention 2-22 | Non-chlorine-series | 75 | LiCl | 0.5 | 25 | 15 | −50 | −60 | −70 | 20 |
| This invention 2-23 | Non-chlorine-series | 75 | LiCl | 1 | 25 | 15 | −50 | −60 | −70 | 20 |
| This invention 2-24 | Non-chlorine-series | 75 | LiCl | 20 | 25 | 15 | −50 | −60 | −70 | 20 |
| This invention 2-25 | Non-chlorine-series | 75 | LiCl | 50 | 25 | 15 | −50 | −60 | −70 | 20 |
| This invention 2-26 | Non-chlorine-series | 75 | NaCl | 5 | 25 | 15 | −50 | −60 | −70 | 20 |
| This invention 2-27 | Non-chlorine-series | 75 | LiCl | 5 | 25 | 15 | −50 | −60 | −70 | 20 |
| This invention 2-28 | Non-chlorine-series | 75 | LiCl | 5 | 25 | 15 | −50 | −60 | −70 | 20 |

(Note)
*Solvent composition of This invention 1 in JP-A-2002-160242
**(Total mol number of inorganic salt/Total mol number of hydroxy group of cellulose acylate)

(3) Production of Cellulose Acylate Film

The aforementioned dope was heated up to 50° C., and cast, by means of a casting die, on a mirror surface stainless support forming a drum having a diameter of 3 m. In this time, a temperature of the support was set at −25° C. As the die, an analog of the form described in JP-A-11-314233 was used. The casting speed was set at 75 m/min. and its casting width to 200 cm. The space temperature in the casting section was set at 15° C. A cellulose acylate film coming by a turn of the drum after casting was pealed from the drum at the point before 50 cm from the casting section. Thereafter, both terminals of the film were clipped with a pin tenter. Then, the cellulose acylate film hold with the pin tenter was conveyed to a drying zone. To begin with an initial drying, a dry air of 45° C. was blown. Further, after unfastening the pin tenter, the film was dried with roll transport at 110° C. for 5 minutes and then at 145° C. for 10 minutes (a temperature of the film was set at about 140° C.) to obtain a 60 μm thick cellulose acylate film. Both terminals of the thus-obtained sample were cut by 3 cm. Then, after knurling of 100 μm in height in the section of 2 to 10 mm from the terminal, the sample was wound in the form of a 3000 m roll film. Temperature-controlled air taken out from the drying zone was cooled thereby to recover a solvent, followed by fractional distillation. Before use, the thus-obtained solvents were mixed with the aforementioned solvent for preparing a dope.

Retardation unevenness (Re unevenness) of each film thus obtained (sample film) was measured according to the method described below. The results were shown in Table 6.

(i) The sample film was conditioned for 3 hours or more under the conditions of 25° C. 60% RH.

(ii) A value of retardation (Re) at the wavelength of 550 nm from the direction perpendicular to the surface of a sample film was measured using an auto double-refractometer (KOBRA-21ADH/PR (trade name) made by Oji Keisokuki K. K.) under the conditions of 25° C. 60% RH.

(iii) The values of retardation were measured 10 times each at the points of 10 m in the length direction from the points divided in equal 10 parts in the width direction. A difference between the maximum value and the minimum value among the measured values of these 100 points was defined as the Re unevenness.

Further, thermal shrinkage was measured according to the method described below. The results are shown in Table 6.

(i) The sample film was cut into a strip of 25 cm×5 cm, and then was conditioned for 3 hours or more under conditions of 25° C. 60% RH. Thereafter, the strip was measured with pin gauges having a base length of 20 cm.

(ii) The strip was subjected to a heat treatment for 50 hours under conditions of 80° C. 90% RH, and then was conditioned for 3 hours or more under conditions of 25° C. 60% RH. Thereafter, the strip was measured with pin gauges having a base length of 20 cm.

(iii) A measurement was conducted in each of the MD and TD directions, at the measuring 100 points of the points divided in equal 10 parts in the width direction×10 times at the point of 10 m in the length direction from the aforementioned points. The difference between the maximum value and the minimum value among the measured values of these 100 points was defined as the unevenness of thermal shrinkage in each of the MD and TD directions.

The results are shown in Table 6. The results shown in Table 6 demonstrate that the cellulose acylate films of Examples according to the present invention are excellent in both unevenness of heat shrinkage and optical unevenness (Re unevenness), compared with those of the comparative examples. The dopes of the present invention each show a diffraction peak characterized in XD according to the present invention, indicating objective crystal growth. In contrast, each dope of a comparative example failed to show a diffraction peak indicating the aforementioned crystal growth.

Further, according to Example 1 of JIII Kokai-Giho (Kogi No. 2001-1745), three-layer co-casting was carried out using the aforementioned dopes. Similar to the above Example, excellent results were obtained.

In addition, cellulose acylate films having a film thickness of 40 μm, 80 μm, 100 μm and 120 μm respectively were prepared in the same manner as the above. Similar to the above Example, excellent performances were obtained.

On the other hand, Comparative examples 2-1, 2-2, 2-3 and 2-4 do not follow the present invention (comparative Example 2-4 corresponds to Examples 1 of JP-A-2002-160242). As a result, none of objective dope can be obtained, and subsequently it is very difficult to obtain cellulose acylate films free of both optical unevenness and heat shrinkage unevenness.

TABLE 5

Physical property of dope

| | XD mesurement | | | | | Absorbance | | Viscoelasticity in a closed system | | | |
| --- | --- | --- | --- | --- | --- | --- | --- | --- | --- | --- | --- |
| | Diffraction peak A | | | Diffraction peak B | | Diffraction peak A/B relative intensity | Minimum absorbance (Am) | Absorbance at −50° C. (A-50)- (Am) | Temperature when tanδ was 1 or less (° C.) | G' when tanδ was 1 (Pa) | ΔG' (Pa/° C.) | Δlog D (cm²/S) |
| | Relative intensity | Peak position 2θ (degree) | Full width at half maximum (degree) | Peak position 2θ (degree) | Full width at half maximum (degree) | | | | | | | |
| This invention 2-1 | 0.25 | 23 | 0.4 | 23 | 12 | 0.22 | 0.08 | 0.12 | −40 | 800 | 80 | 2.4 |
| This invention 2-2 | 0.8 | 22 | 0.8 | 22 | 14 | 0.45 | 0.05 | 0.18 | −20 | 2200 | 200 | 5.1 |
| This invention 2-3 | 0.1 | 24 | 0.1 | 24 | 10 | 0.08 | 0.06 | 0.1 | −50 | 600 | 50 | 1.4 |
| Comparative example 2-1 | 0 | — | — | 22 | 9 | 0 | 0.07 | 0 | −90 | 200 | 4 | 0 |
| This invention 2-4 | 0.2 | 23 | 0.4 | 22 | 12 | 0.18 | 0.07 | 0.06 | −40 | 1000 | 110 | 3.6 |
| This invention 2-5 | 0.3 | 22 | 0.5 | 23 | 13 | 0.25 | 0.12 | 0.65 | −40 | 900 | 100 | 3.1 |
| This invention 2-6 | 0.4 | 22 | 0.6 | 23 | 12 | 0.45 | 0.17 | 2.8 | −35 | 1200 | 160 | 4.5 |
| This invention 2-7 | 0.15 | 23 | 0.3 | 22 | 11 | 0.15 | 0.12 | 0.02 | −75 | 600 | 50 | 1.3 |
| Comparative example 2-2 | 0.04 | 22 | 0.2 | 22 | 10 | 0.04 | 0.18 | 0 | −95 | 300 | 3 | 0 |
| This invention 2-8 | 1.4 | 23 | 1.1 | 21 | 11 | 0.93 | 0.11 | 0.17 | −10 | 3200 | 280 | 5.5 |
| This invention 2-9 | 0.1 | 21 | 0.2 | 20 | 10 | 0.08 | 0.12 | 0.1 | −50 | 700 | 30 | 0.7 |
| Comparative example 2-3 | 0 | — | — | 22 | 12 | 0 | 0.16 | 0 | −85 | 200 | 4 | 0 |
| This invention 2-10 | 0.45 | 22 | 0.5 | 22 | 10 | 0.35 | 0.12 | 0.25 | −30 | 1000 | 160 | 4 |
| This invention 2-11 | 0.2 | 24 | 0.4 | 20 | 14 | 0.18 | 0.11 | 0.1 | −50 | 600 | 70 | 2 |
| This invention 2-12 | 0.06 | 22 | 0.2 | 24 | 15 | 0.07 | 0.17 | 0.04 | −75 | 500 | 30 | 1.1 |
| This invention 2-13 | 1.1 | 21 | 0.7 | 25 | 11 | 0.3 | 0.16 | 0.33 | −55 | 800 | 120 | 3.4 |
| This invention 2-14 | 0.35 | 23 | 0.3 | 22 | 10 | 0.24 | 0.12 | 0.19 | −60 | 700 | 100 | 2.9 |
| This invention 2-15 | 1.9 | 21 | 1.7 | 18 | 3 | 0.98 | 0 | 0.01 | 11 | 4200 | 350 | 6.1 |
| This invention 2-16 | 1.5 | 20 | 1.2 | 16 | 4 | 0.63 | 0.2 | 2.9 | −65 | 500 | 20 | 0.6 |

TABLE 5-continued

| | Physical property of dope | | | | | | | | | | |
|---|---|---|---|---|---|---|---|---|---|---|---|
| | XD mesurement | | | | | Absorbance | | Viscoelasticity in a closed system | | | |
| | Diffraction peak A | | | Diffraction peak B | | Diffrac- | Mini- | Absor- | Temper- | | | |
| | Relative intensity | Peak position 2θ (degree) | Full width at half maximum (degree) | Peak position 2θ (degree) | Full width at half maximum (degree) | tion peak A/B relative intensity | mum absor- bance (Am) | bance at −50° C. (A-50)- (Am) | ature when tanδ was 1 or less (° C.) | G' when tanδ was 1 (Pa) | ΔG' (Pa/° C.) | ΔlogD (cm²/S) |
| This invention 2-17 | 2 | 25 | 1.8 | 28 | 18 | 0.78 | 0.4 | 1.9 | −75 | 600 | 30 | 0.9 |
| This invention 2-18 | 0.25 | 23 | 0.4 | 23 | 12 | 0.22 | 0.08 | 0.12 | −40 | 800 | 80 | 2.3 |
| This invention 2-19 | 0.25 | 23 | 0.4 | 23 | 12 | 0.22 | 0.08 | 0.12 | −40 | 800 | 80 | 2.2 |
| This invention 2-20 | 0.29 | 23 | 0.5 | 22 | 14 | 0.27 | 0.07 | 0.14 | −35 | 900 | 90 | 2.8 |
| Comparative example 2-4 | 0 | — | — | 22 | 13 | 0 | 0.05 | 0 | −100 | 150 | 5 | 0.1 |
| This invention 2-21 | 0.55 | 23 | 0.4 | 23 | 12 | 0.44 | 0.08 | 0.18 | −20 | 2500 | 200 | 5.2 |
| This invention 2-22 | 0.32 | 23 | 0.5 | 23 | 11 | 0.3 | 0.07 | 0.14 | −32 | 1500 | 120 | 3.2 |
| This invention 2-23 | 0.43 | 23 | 0.5 | 23 | 11 | 0.36 | 0.08 | 0.16 | −27 | 2000 | 160 | 4.2 |
| This invention 2-24 | 1.01 | 23 | 0.3 | 22 | 13 | 0.48 | 0.08 | 0.22 | −10 | 3500 | 240 | 7.3 |
| This invention 2-25 | 1.68 | 23 | 0.3 | 22 | 13 | 0.49 | 0.1 | 0.25 | −5 | 3900 | 280 | 7.8 |
| This invention 2-26 | 0.45 | 23 | 0.4 | 23 | 11 | 0.39 | 0.1 | 0.14 | −25 | 2000 | 160 | 3.8 |
| This invention 2-27 | 0.45 | 23 | 0.4 | 23 | 12 | 0.32 | 0.07 | 0.12 | −30 | 1800 | 150 | 4.3 |
| This invention 2-28 | 0.81 | 23 | 0.3 | 23 | 12 | 0.61 | 0.09 | 0.28 | −10 | 3900 | 300 | 7.1 |

TABLE 6

| | Physical property of cellulose acylate | | | | | Unevenness of liquid crystal display device | | | |
|---|---|---|---|---|---|---|---|---|---|
| | Uneven thermal shrinkage | | | | | 50° C., 100 hours | | 50° C., 200 hours | |
| | MD (%) | TD (%) | Reuneven- ness (nm) | Saponification method | Stretching method of polarizing plate | OCB type (%) | VA type (%) | OCB type (%) | VA type (%) |
| This invention 2-1 | 0.01 | 0.01 | 2 | Coating saponification | Oblique stretching | 0 | 0 | 0.3 | 0.3 |
| This invention 2-2 | 0 | 0 | 1 | Coating saponification | Oblique stretching | 0 | 0 | 0 | 0 |
| This invention 2-3 | 0.02 | 0.01 | 3 | Coating saponification | Oblique stretching | 0 | 0.5 | 0.3 | 0.7 |
| Comparative example 2-1 | 0.9 | 0.93 | 14 | Coating saponification | Oblique stretching | 8 | 9 | 18 | 22 |
| This invention 2-4 | 0.01 | 0 | 2 | Coating saponification | Oblique stretching | 0 | 0 | 0.2 | 0.3 |
| This invention 2-5 | 0.01 | 0.02 | 2 | Coating saponification | Oblique stretching | 0 | 0 | 0.3 | 0.2 |
| This invention 2-6 | 0 | 0 | 1 | Coating saponification | Oblique stretching | 0 | 0 | 0.1 | 0.2 |
| This invention 2-7 | 0.02 | 0.03 | 3 | Coating saponification | Oblique stretching | 0.5 | 0 | 0.9 | 0.5 |
| Comparative example 2-2 | 1 | 1.1 | 18 | Coating saponification | Oblique stretching | 10 | 11 | 22 | 19 |
| This invention 2-8 | 0 | 0 | 0 | Coating saponification | Oblique stretching | 0 | 0 | 0 | 0.1 |
| This invention 2-9 | 0.02 | 0.01 | 3 | Coating saponification | Oblique stretching | 0.1 | 0.4 | 0.5 | 0.3 |
| Comparative example 2-3 | 1.2 | 1.25 | 20 | Coating saponification | Oblique stretching | 8 | 9 | 28 | 25 |
| This invention 2-10 | 0.01 | 0 | 2 | Coating saponification | Oblique stretching | 0 | 0 | 0 | 0.1 |

TABLE 6-continued

| | Physical property of cellulose acylate | | | | | Unevenness of liquid crystal display device | | | |
|---|---|---|---|---|---|---|---|---|---|
| | Uneven thermal shrinkage | | | | | 50° C., 100 hours | | 50° C., 200 hours | |
| | | | | | Stretching method | OCB | VA | OCB | VA |
| | MD (%) | TD (%) | Reuneven-ness (nm) | Saponification method | of polarizing plate | type (%) | type (%) | type (%) | type (%) |
| This invention 2-11 | 0.01 | 0.02 | 3 | Coating saponification | Oblique stretching | 0 | 0 | 0.4 | 0.2 |
| This invention 2-12 | 0.08 | 0.09 | 8 | Coating saponification | Oblique stretching | 1.2 | 1.4 | 0.6 | 0.8 |
| This invention 2-13 | 0.02 | 0.03 | 2 | Coating saponification | Oblique stretching | 0.1 | 0 | 0.1 | 0 |
| This invention 2-14 | 0.04 | 0.03 | 3 | Coating saponification | Oblique stretching | 0.1 | 0.1 | 0.2 | 0.2 |
| This invention 2-15 | 0.06 | 0.05 | 8 | Coating saponification | Oblique stretching | 2 | 2 | 0 | 0 |
| This invention 2-16 | 0.05 | 0.06 | 9 | Coating saponification | Oblique stretching | 1.1 | 1.2 | 0.8 | 0.5 |
| This invention 2-17 | 0.07 | 0.08 | 8 | Coating saponification | Oblique stretching | 1 | 1.1 | 0.6 | 0.5 |
| This invention 2-18 | 0.01 | 0.01 | 2 | Dip saponification | Oblique stretching | 0 | 0 | 0.2 | 0.3 |
| This invention 2-19 | 0.01 | 0.01 | 2 | Coating saponification | Parallel stretching | 0.8 | 0.6 | 0.3 | 0.2 |
| This invention 2-20 | 0.01 | 0.01 | 2 | Coating saponification | Oblique stretching | 0 | 0 | 0.2 | 0.2 |
| Comparative example 2-4 | 0.95 | 0.1 | 18 | Coating saponification | Oblique stretching | 12 | 14 | 0.9 | 0.7 |
| This invention 2-21 | 0 | 0 | 0 | Coating saponification | Oblique stretching | 0 | 0 | 0 | 0.1 |
| This invention 2-22 | 0 | 0 | 0.5 | Coating saponification | Oblique stretching | 0 | 0 | 0.1 | 0.1 |
| This invention 2-23 | 0 | 0 | 0.2 | Coating saponification | Oblique stretching | 0 | 0 | 0.1 | 0.1 |
| This invention 2-24 | 0 | 0 | 0 | Coating saponification | Oblique stretching | 0 | 0 | 0 | 0 |
| This invention 2-25 | 0 | 0 | 0 | Coating saponification | Oblique stretching | 0 | 0 | 0 | 0 |
| This invention 2-26 | 0 | 0 | 0.1 | Coating saponification | Oblique stretching | 0 | 0 | 0.1 | 0.1 |
| This invention 2-27 | 0 | 0.1 | 1 | Coating saponification | Oblique stretching | 0 | 0 | 0.1 | 0.2 |
| This invention 2-28 | 0 | 0 | 0 | Coating saponification | Oblique stretching | 0 | 0 | 0 | 0 |

(4) Saponification of Cellulose Acylate Films

Saponification was carried out according to any one of the methods described below. Table 6 describes which method was used.

(i) Coating Saponification

To 80 parts by mass of iso-propanol, 20 parts by mass of water was added, and KOH was dissolved therein so as to become 1.5N. The solution temperature-controlled to 60° C. was used as a saponifying solution. The saponifying solution was coated on a cellulose acylate film of 60° C. in a coating amount of 10 g/m, followed by saponification for 1 minute.

Thereafter, a warm water of 50° C. was sprayed upon the film using a spray at a rate of 10 L/m min for 1 minute to wash the film.

(ii) Dip Saponification

A 1.5N aqueous solution of NaOH was used as a saponifying solution.

The solution was temperature-controlled to 60° C., and a cellulose acylate film was dipped therein for 2 minutes.

Thereafter, the film was dipped in a 0.1N sulfuric acid aqueous solution for 30 seconds, and then passed through a washing bath.

2. Preparation of Polarizing Plates (1) Preparation of Polarizing Layers

20 μm thick polarizing layers were prepared according to any one of the methods described below (described in Table 6).

(i) Oblique Stretching Method

A polyvinyl alcohol (PVA) film was stretched so that the stretching axis became an oblique angle of 45 degree using a tentering (stretching) machine according to Example 1 of JP-A-2002-086554.

(ii) Parallel Stretching Method

A polyvinyl alcohol (PVA) film was stretched in the length direction applying a difference of peripheral speed between two pairs of nip rollers according to Example 1 of JP-A-2001-141926.

(2) Laminating

The thus-obtained polarizing layer and the aforementioned saponification-processed cellulose acylate film were laminated with a 3% aqueous solution of polyvinyl alcohol (PVA-117H (trade name) made by KURARAY CO. LTD) as adhesives so that axis of polarization and the length direction of the cellulose acylate film was at an angle of 45 degree. Excellent performances were obtained according to the present invention.

3. Preparation of Optical Compensation Film (i) The first transparent support used in Example 1 of JP-A-11-316378 was replaced with the cellulose acylate film of the present invention. Thereby an excellent optical compensation film was successfully prepared.

(ii) The cellulose triacetate film (made by Fuji Photo Film Co. Ltd.) that was used in Example 1 of JP-A-7-333433 was replaced with the cellulose acylate film of the present invention to prepare an optical compensation filter film. It was confirmed that the thus-filter film had an excellent view angle in both bilateral directions and vertical directions.

4. Preparation of Low Reflective Films

The cellulose acylate film of the present invention was used to prepare low reflective films according to Example 47 of JIII Kokai-Giho (Kogi No. 2001-1745). Thereby excellent optical performances were obtained.

5. Preparation of Liquid Crystal Display Devices

The aforementioned polarizing plates of the present invention were applied to liquid crystal display devices described in Example 1 of JP-A-10-48420, optical anisotropy layers containing discotic liquid crystal molecules described in Example 1 of JP-A-9-26572, orientation films coated with polyvinyl alcohol, 20 inch-VA type liquid crystal display devices described in FIGS. 2-9 of JP-A-2000-154261, and 20 inch-OCB type liquid crystal display devices described in FIGS. 10-15 of JP-A-2000-154261. Further, the low reflective films of the present invention were applied to the outermost layer of these liquid crystal display devices to evaluate performances described below. As a result, such excellent visibility as shown in Table 6 was obtained.

Evaluation Method (1)

100 sets of the liquid crystal display devices prepared by arbitrarily sampling from both the length direction and the width direction of the original cellulose acylate film were left at 50° C. for 100 hours, and immediately thereafter they were taken out. Unevenness of image display was evaluated by native eye. With respect to the liquid crystal display device in which the largest display unevenness of these ones generated, the region in which the display unevenness generated was indicated by percentage. Namely, unevenness of raw fabric cellulose acylate film was evaluated over a wide range of from the length direction to the width direction. The cellulose acylate films prepared according to the present invention exhibited excellent characteristic properties.

Evaluation Method (2)

Evaluation was carried out in the same manner as the aforementioned evaluation method (1), except that the standing was changed to the condition of 50° C./100 hours. The cellulose acylate films prepared according to the present invention exhibited excellent characteristic properties.

In addition, liquid crystal display devices were prepared in the same manner as the above, except for using a three layer-co-casting cellulose acylate film, and cellulose acylate films having a film thickness of 40 μm, 80 μm, 100 μm and 120 μm respectively. As a result, similarly excellent performances were obtained.

6. Application to Supports of Silver Halide Photosensitive Materials

A 120 μm thick cellulose acylate film of the present invention was used in Examples of 63, 64 and 65 of JIII Kokai-Giho (Kogi No. 2001-1745). As a result, even after a long-term storage (50° C. 500 hours), excellent performances were obtained.

Having described our invention as related to the present embodiments, it is our intention that the invention not be limited by any of the details of the description, unless otherwise specified, but rather be construed broadly within its spirit and scope as set out in the accompanying claims.

This nonprovisional application claims priority under 35 U.S.C. § 119 (a) on Patent Application No. 2003-159273 filed in Japan on Jun. 4, 2003, Patent Application No. 2003-159982 filed in Japan on Jun. 4, 2003, and Patent Application No. 2003-374856 filed in Japan on Nov. 4, 2003, which are herein incorporated by reference.

I claim:

1. A cellulose acylate-based dope, which has an exothermic peak giving a calorific value of 1 to 10 J/g (inclusive), between 0 and 40° C., wherein collected wastes of cellulose acylate which are obtained by collecting and crushing a cellulose acylate film edge trimmed when raw material of the film is cast, are used in an amount of 5 to 60% by weight of the whole of the cellulose acylate.

2. The cellulose acylate-based dope according to claim 1, wherein the absorbance (A40) of the dope to a wavelength of 550 nm at 40° C. is 0.02 to 3 (inclusive) higher than the minimum absorbance (Am) thereof to a wavelength of 550 nm at temperatures ranging from 0 to −40° C.

3. The cellulose acylate-based dope according to claim 1, wherein the infrared spectrum intensity ratio of the dope before the addition of boric acid (A1=a value obtained by dividing the absorbance of the dope to a wave number of 3552 $cm^{-1}$ by the absorbance thereof to a wave number of 3475 $cm^{-1}$, or A2=a value obtained by dividing the absorbance of the dope to a wave number of 3629 $cm^{-1}$ by the absorbance thereof to a wave number of 3475 $cm^{-1}$), and the infrared spectrum intensity ratio when 1.5%, by mass, of boric acid is added to the dope (B1=a value obtained by dividing the absorbance of the dope to a wave number of 3552 $cm^{-1}$ by the absorbance thereof to a wave number of 3475 $cm^{-1}$, or B2=a value obtained by dividing the absorbance of the dope to a wave number of 3629 $cm^{-1}$ by the absorbance thereof to a wave number of 3475 $cm^{-1}$), satisfy the following expressions (A) and (B):

$$3.0 \geq B1/A1 \geq 1.2 \quad \text{Expression (A)}$$

$$3.0 \geq B2/A2 \geq 1.2 \quad \text{Expression (B).}$$

4. The cellulose acylate-based dope according to claim 1, wherein the cellulose acylate is made of one, or a mixture of two or more, cellulose acylates wherein the substitution degree of cellulose to a hydroxy group satisfies all of the following expressions (1) to (3):

$$2.6 \leq SA + SB \leq 3.0 \quad (1)$$

$$2.0 \leq SA \leq 3.0 \quad (2)$$

$$0 \leq SB \leq 0.8 \quad (3)$$

wherein, SA and SB represent degrees of substitution of acyl groups for hydroxyl groups of cellulose, and SA is the degree of acetyl substitution and SB is the degree of acyl substitution having 3 to 22 carbon atoms.

5. The cellulose acylate-based dope according to claim 4, wherein at least one chlorine-free organic solvent is used, which is selected from ethers having 3 to 12 carbon atoms, ketones having 3 to 12 carbon atoms, and esters having 3 to 12 carbon atoms.

6. A cellulose acylate film produced by use of the cellulose acylate-based dope according to claim 1.

7. The cellulose acylate film according to claim 6, which is for a polarizing plate, for an optically compensating film, or for a low reflecting film.

8. The cellulose acylate film according to claim 6, which is for a liquid crystal display element.

9. A process for producing a cellulose acylate-based dope, comprising the steps of:
  (1) adding collected wastes of cellulose acylate, which are obtained by collecting and crushing a cellulose acylate film edge trimmed when raw material of the film is cast, again when the dope is produced, wherein the collected wastes of cellulose acylate are used in an amount of 5 to 60% by weight of the whole of the cellulose acylate and
  (2) cooling the cellulose acylate, and heating the cellulose acylate stepwise, to dissolve the cellulose acylate.

10. The process according to claim 9, wherein the obtained cellulose acylate-based dope has an exothermic peak giving a calorific value of 1 to 10 J/g (inclusive), between 0 and 40° C.

11. The process according to claim 9, wherein the heating temperature of a downstream-side is higher than that of an upstream-side by 5 to 30° C.

12. The process according to claim 9, wherein the cellulose acylate is made of one, or a mixture of two or more, cellulose acylates wherein the substitution degree of cellulose to a hydroxy group satisfies all of the following expressions (1) to (3):

$$2.6 \leq SA+SB \leq 3.0 \tag{1}$$

$$2.0 \leq SA \leq 3.0 \tag{2}$$

$$0 \leq SB \leq 0.8 \tag{3}$$

wherein, SA and SB represent degrees of substitution of acyl groups for hydroxyl groups of cellulose, and SA is the degree of acetyl substitution and SB is the degree of acyl substitution having 3 to 22 carbon atoms.

13. A cellulose acylate-based dope having a diffraction peak (A) whose full width at half maximum is from 0.1 degrees to 2 degrees in the range from 2θ=20 degrees to 2θ=25 degrees, when measured according to X-ray diffraction while cooling at −50° C., wherein the dope comprises a solvent, wherein a recovery solvent is used in an amount of 20 to 100% of the entire solvent.

14. The cellulose acylate-based dope according to claim 13, wherein the relative intensity of the diffraction peak (A) is in the range from 0.05 to 2.

15. The cellulose acylate-based dope according to claim 13, further having a diffraction peak (B) whose full width at half maximum is from 3 degrees to 20 degrees in the range from 2θ=15 degrees to 2θ=28 degrees.

16. The cellulose acylate-based dope according to claim 15, wherein the ratio of the diffraction peak (A) to the diffraction peak (B) is from 0.05 to 1 in terms of peak intensity.

17. The cellulose acylate-based dope according to claim 13, wherein an absorbance of 550 nm at −50° C. (A−50) is higher, by a range from 0.01 to 3, than a minimum absorbance of 550 nm in the range from 0° C. to −40° C. (Am).

18. The cellulose acylate-based dope according to claim 13, wherein a property that a temperature at which tanδ (a value of G" (Viscous Modulus) divided by G' (Elastic Modulus)) of not more than 1 is obtained, when measured in a closed system, is in the range from −80° C. to 15° C.

19. The cellulose acylate-based dope according to claim 18, wherein G' at the temperature giving tanδ of 1, when measured in a closed system, is in the range from 400 Pa to 4,000 Pa.

20. The cellulose acylate-based dope according to claim 13, wherein two or more peaks exist in a distribution curve of diffusion constant at −50° C., in which the difference in the natural logarithm of the diffusion constant between the highest peak and the second highest peak of these peaks is in the range from 0.5 to 8 in terms of absolute value (ΔlogD).

21. The cellulose acylate-based dope according to claim 13, wherein the cellulose acylate-series dope is prepared with a cellulose acylate having a property that, in terms of the ratio in height of a peak in the neighborhood of 1056 cm$^{-1}$, to a peak in the neighborhood of 1753 cm$^{-1}$, measured according to infrared spectrophotometry (IR), a value of the ratio measured at −50° C. (I(−50)) is larger, by a range from 0.1 to 1.5, than a value of the aforementioned ratio measured at 25° C. (I(25)).

22. The cellulose acylate-based dope according to claim 13, wherein the cellulose acylate is made of one or a mixture of two or more selected from cellulose acylates wherein the substitution degree of cellulose to a hydroxy group satisfies all of the following expressions (I) to (III):

$$2.6 \leq SA+SB \leq 3.0 \tag{I}$$

$$2.0 \leq SA \leq 3.0 \tag{II}$$

$$0 \leq SB \leq 0.8 \tag{III}$$

wherein, SA and SB represent degrees of substitution of acyl groups for hydroxyl groups of cellulose, and more specifically SA is the degree of acetyl substitution and SB is the degree of acyl substitution having 3 to 22 carbon atoms.

23. The cellulose acylate-based dope according to claim 22, wherein at least one chlorine-free organic solvent is used, which is selected from ethers having 3 to 12 carbon atoms, ketones having 3 to 12 carbon atoms, and esters having 3 to 12 carbon atoms.

24. A cellulose acylate film produced by use of the cellulose acylate-based dope according to claim 13.

25. The cellulose acylate film according to claim 24, which is for a polarizing plate, for an optically compensating film, or for a low reflecting film.

26. The cellulose acylate film according to claim 24, which is for a liquid crystal display element.

27. A process for producing a cellulose acylate-based dope, comprising the steps of:
  (1) swelling a cellulose acylate before dissolution;
  (2) introducing the swelled cellulose acylate to a solvent, wherein a recovery solvent is used in an amount of 20 to 100% of the entire solvent; and
  (3) subjecting the resulting mixture to a cooling/heat-up dissolution process in which the temperature of the resulting mixture is reduced and subsequently increased.

28. The process according to claim 27, wherein in the cooling/heat-up dissolution process, the temperature of the resulting mixture is reduced over multiple stages of an extrusion screw.

29. The process according to claim 27, wherein the obtained cellulose acylate-based dope has a diffraction peak (A) whose full width at half maximum is from 0.1 degrees to 2 degrees in the range from 2θ=20 degrees to 2θ=25 degrees, when measured according to X-ray diffraction while cooling at −50° C.

30. The process according to claim 27, wherein the swelling process is conducted by two or more stages of temperature, in which the first stage is conducted at a temperature of 10 to 30° C., and the rest of the stages is conducted at a temperature higher than that of the first stage by 3 to 30° C.

31. The process according to claim 27, wherein in the cooling/heat-up dissolution, the resulting mixture is cooled to −30° C. to −90° C.

32. The process according to claim 27, wherein the cellulose acylate is made of one or a mixture of two or more cellulose acylates wherein the substitution degree of cellulose to a hydroxy group satisfies all of the following expressions (I) to (III):

$$2.6 \leq SA+SB \leq 3.0 \quad (I)$$

$$2.0 \leq SA \leq 3.0 \quad (II)$$

$$0 \leq SB \leq 0.8 \quad (III)$$

wherein, SA and SB represent degrees of substitution of acyl groups for hydroxyl groups of cellulose, and SA is the degree of acetyl substitution and SB is the degree of acyl substitution having 3 to 22 carbon atoms.

33. The process according to claim 27, wherein the duration of the step of swelling a cellulose acylate before dissolution is 0.1 to 100 hours.

* * * * *